(12) United States Patent
Zevenbergen et al.

(10) Patent No.: US 10,676,022 B2
(45) Date of Patent: Jun. 9, 2020

(54) VISUALLY INDICATING VEHICLE CAUTION REGIONS

(71) Applicant: X Development LLC, Mountain View, CA (US)

(72) Inventors: John Zevenbergen, Saratoga, CA (US); Robert Holmberg, Mountain View, CA (US); Mark Fischer, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 243 days.

(21) Appl. No.: 15/854,850

(22) Filed: Dec. 27, 2017

(65) Prior Publication Data

US 2019/0193629 A1    Jun. 27, 2019

(51) Int. Cl.
| | |
|---|---|
| *B60Q 1/50* | (2006.01) |
| *G01C 21/20* | (2006.01) |
| *G05D 1/02* | (2020.01) |
| *G01C 21/34* | (2006.01) |
| *B60Q 1/02* | (2006.01) |

(52) U.S. Cl.
CPC ............ *B60Q 1/50* (2013.01); *G01C 21/20* (2013.01); *G01C 21/206* (2013.01); *G01C 21/3461* (2013.01); *G05D 1/0214* (2013.01); *B60Q 1/02* (2013.01); *B60Q 2400/50* (2013.01)

(58) Field of Classification Search
CPC ........ B60Q 1/50; B60Q 1/02; B60Q 2400/50; G01C 21/20; G01C 21/3461; G01C 21/206; G05D 1/0214
See application file for complete search history.

(56) References Cited

U.S. PATENT DOCUMENTS

| | | | |
|---|---|---|---|
| 4,933,864 | A | 6/1990 | Evans et al. |
| 5,548,694 | A | 8/1996 | Frisken Gibson |

(Continued)

FOREIGN PATENT DOCUMENTS

| | | |
|---|---|---|
| EP | 1516704 | 3/2005 |
| EP | 2380709 | 10/2011 |

(Continued)

OTHER PUBLICATIONS

Fraunhofer-Gsesllschaft, "Robotics: Safety without protective barriers." ScienceDaily, Jul. 8, 2011, www.sciencedaily.com/releases/2011/07/110708083312.htm.

(Continued)

*Primary Examiner* — Rodney A Butler
(74) *Attorney, Agent, or Firm* — McDonnell Boehnen Hulbert & Berghoff LLP

(57) ABSTRACT

An example system includes a vehicle, a light projector connected to the vehicle, and a control system. The control system is configured to determine a planned operating region for the vehicle within an environment. The control system is also configured to determine that the planned operating region is within a threshold distance of an object within the environment and, in response, determine a caution region to illuminate with the light projector near the object. The control system is further configured to cause the light projector to project an indication of the caution region near the object. The projected indication remains fixed in relation to the object as the vehicle moves toward the planned operating region.

16 Claims, 19 Drawing Sheets

(56) References Cited

U.S. PATENT DOCUMENTS

| | | | |
|---|---|---|---|
| 5,835,684 | A | 11/1998 | Bourne et al. |
| 6,212,443 | B1 | 4/2001 | Nagata et al. |
| 7,298,385 | B2 | 11/2007 | Kazi et al. |
| 7,447,593 | B2 | 11/2008 | Estkowski et al. |
| 7,627,394 | B2 | 12/2009 | Volcic et al. |
| 7,769,491 | B2 | 8/2010 | Fukuchi et al. |
| 7,873,438 | B2 | 1/2011 | Sekiya |
| 8,019,475 | B2 | 9/2011 | Kuroda |
| 8,036,775 | B2 | 10/2011 | Matsumoto et al. |
| 8,244,403 | B2 | 8/2012 | Lin et al. |
| 8,315,738 | B2 | 11/2012 | Chang et al. |
| 8,325,027 | B2 | 12/2012 | Tee et al. |
| 8,355,818 | B2 | 1/2013 | Nielsen et al. |
| 8,718,837 | B2 | 5/2014 | Wang et al. |
| 8,843,234 | B2 | 9/2014 | Tao et al. |
| 8,849,452 | B2 | 9/2014 | Takeda et al. |
| 8,918,208 | B1 | 12/2014 | Hickman et al. |
| 8,930,023 | B2 | 1/2015 | Gutmann et al. |
| 9,230,419 | B2 | 1/2016 | Beggs et al. |
| 9,283,678 | B2 | 3/2016 | Kuffner et al. |
| 9,567,102 | B1 | 2/2017 | Ross |
| 9,596,451 | B2 | 3/2017 | Walter et al. |
| 9,682,477 | B2 | 6/2017 | Sisbot |
| 9,738,494 | B2 | 8/2017 | Shubel et al. |
| 2003/0225479 | A1 | 12/2003 | Waled |
| 2004/0267320 | A1 | 12/2004 | Taylor et al. |
| 2005/0004709 | A1 | 1/2005 | Watanabe et al. |
| 2005/0096892 | A1 | 5/2005 | Watanabe et al. |
| 2006/0075356 | A1 | 4/2006 | Faulkner et al. |
| 2006/0103590 | A1 | 5/2006 | Divon |
| 2006/0152533 | A1 | 7/2006 | Read |
| 2006/0184275 | A1 | 8/2006 | Hosokawa et al. |
| 2007/0027621 | A1 | 2/2007 | Operowsky et al. |
| 2007/0150093 | A1 | 6/2007 | Nagatsuka et al. |
| 2007/0255454 | A1 | 11/2007 | Dariush |
| 2008/0114492 | A1 | 5/2008 | Volker et al. |
| 2008/0231221 | A1 | 9/2008 | Ogawa |
| 2008/0243305 | A1 | 10/2008 | Lee et al. |
| 2008/0316368 | A1 | 12/2008 | Fritsch et al. |
| 2009/0118890 | A1 | 5/2009 | Lin et al. |
| 2009/0164202 | A1 | 6/2009 | Lonnemark et al. |
| 2009/0180076 | A1 | 7/2009 | Lin et al. |
| 2009/0204258 | A1 | 8/2009 | Tao et al. |
| 2009/0319081 | A1 | 12/2009 | Kock et al. |
| 2009/0326679 | A1 | 12/2009 | Iba |
| 2010/0198494 | A1 | 8/2010 | Chao et al. |
| 2010/0241289 | A1 | 9/2010 | Sandberg |
| 2010/0253489 | A1 | 10/2010 | Cui et al. |
| 2010/0253918 | A1 | 10/2010 | Seder et al. |
| 2010/0318478 | A1 | 12/2010 | Yoshiike et al. |
| 2010/0318479 | A1 | 12/2010 | Noda et al. |
| 2011/0025484 | A1 | 2/2011 | Mullick |
| 2011/0055255 | A1 | 3/2011 | Shaw et al. |
| 2011/0087425 | A1 | 4/2011 | Deng et al. |
| 2011/0231016 | A1 | 9/2011 | Goulding |
| 2011/0304633 | A1 | 12/2011 | Beardsley et al. |
| 2011/0311127 | A1 | 12/2011 | Mizutani et al. |
| 2011/0319910 | A1 | 12/2011 | Roelle et al. |
| 2012/0025962 | A1 | 2/2012 | Toll |
| 2012/0044265 | A1 | 2/2012 | Khorashadi et al. |
| 2012/0069150 | A1 | 3/2012 | Rivera |
| 2012/0075072 | A1 | 3/2012 | Pappu |
| 2012/0083923 | A1 | 4/2012 | Matsumoto et al. |
| 2012/0182155 | A1 | 7/2012 | Sato et al. |
| 2012/0197439 | A1 | 8/2012 | Wang et al. |
| 2012/0290132 | A1 | 11/2012 | Kokubo et al. |
| 2013/0050242 | A1 | 2/2013 | Atkins |
| 2013/0050276 | A1 | 2/2013 | Moriya |
| 2013/0066520 | A1 | 3/2013 | Hales et al. |
| 2013/0211597 | A1 | 8/2013 | Sommerville |
| 2013/0218395 | A1 | 8/2013 | Kim et al. |
| 2013/0346168 | A1 | 12/2013 | Zhou et al. |
| 2014/0055252 | A1 | 2/2014 | Ascencio |
| 2014/0063055 | A1 | 3/2014 | Osterhout et al. |
| 2014/0110893 | A1 | 4/2014 | Kinsman et al. |
| 2014/0114845 | A1 | 4/2014 | Rogers et al. |
| 2014/0158468 | A1 | 6/2014 | Adami |
| 2014/0163730 | A1 | 6/2014 | Mian |
| 2014/0277737 | A1 | 9/2014 | Sekiyama et al. |
| 2014/0316570 | A1 | 10/2014 | Sun et al. |
| 2014/0330432 | A1 | 11/2014 | Simaan et al. |
| 2015/0202770 | A1 | 7/2015 | Patron |
| 2015/0203023 | A1 | 7/2015 | Marti et al. |
| 2015/0239127 | A1 | 8/2015 | Barajas et al. |
| 2015/0339926 | A1 | 11/2015 | Lange et al. |
| 2015/0355333 | A1* | 12/2015 | Ono ............... G01S 17/936 356/4.01 |
| 2016/0016311 | A1 | 1/2016 | Konolige et al. |
| 2016/0016315 | A1 | 1/2016 | Kuffner et al. |
| 2017/0106793 | A1* | 4/2017 | Kumar ............... B60Q 1/085 |
| 2019/0104377 | A1* | 4/2019 | Nilsson ............... H04W 84/18 |
| 2019/0118705 | A1* | 4/2019 | Yu ............... B60Q 1/503 |

FOREIGN PATENT DOCUMENTS

| | | |
|---|---|---|
| EP | 2754584 | 7/2014 |
| JP | 2012-218120 | 11/2012 |
| WO | 2017025551 | 2/2017 |

OTHER PUBLICATIONS

Fraunhofer-Gsesllschaft, "Robots: Humans' Dependable Helpers," Retrieved on Nov. 26, 2017, https://www.iff.fraunhofer.de/en/business-units/robotic-systems/technologies/workplacemonitoring-sensors.html.

Fraunhofer-Gsesllschaft, "Robots: Humans' Dependable Helpers," Retrieved on Nov. 26, 2017, https://www.iff.fraunhofer.de/en/business-units/robotic-systems/echord-execell.html.

John Stevenson, "Bransons back Blaze laser-projection bike safety light," Retrieved on Nov. 26, 2017, http://road.cc/content/news/111141-bransons-back-blaze-laser-projection-bike-safety-light.

Al Bredenberg, "Zone for Night Cycling," Retrieved on Nov. 27, 2017, https://inhabitat.com/bike-zone-device-creates-a-lighted-safety-zone-for-night-cycling/.

Aledo, "Projection of light symbols," Retrieved on Nov. 26, 2017, https://en.aledo.cz/projection-of-light-symbols-and-signs/.

Ali Express, "Newest Anti-Collision Rear-end Auto Car Red Laser Tail Safety Fog Warning Light 12v-24v Waterproof Brake Parking Lamp," Retrieved on Nov. 26, 2017, https://www.aliexpress.com/item/Newest-Anti-Collision-Rear-end-Auto-Car-Red-Laser-Tail-Safety-Fog-Warning-Light-12v-24v/32335922089.html?sp%E2%80%A6.

Creative Safety Supply, "Projected Light for Tape," Retrieved on Nov. 26, 2017, https://www.creativesafetysupply.com/projected-light-for-tape/.

Chadalavada et al., "That's on my Mind! Robot to Human Intention Communication through on-board Projection on Shared Floor Space," 2015 European Conference on Mobile Robots (ECMR), Sep. 2, 2015.

Surmann et al., "An autonomous mobile robot with a 3D laser range finder for 3D exploration and digitalization of indoor environments", Robotics and Autonomous Systems, pp. 181-198, Jan. 8, 2003.

Holz et al., "Continuous 3D Environment Sensing for Autonomous Robot Navigation and Mapping", University of Applied Sciences Bonn-Rhein-Sieg, Aug. 2007.

Rybski et al., "Sensor Fusion for Human Safety in Industrial Workcells", Proceedings of the IEEE/RSJ International Conference on Intelligent Robots and Systems (IROS), Oct. 2012.

Anderson-Sprecher et al., "Voxel-Based Motion Bounding and Workspace Estimation for Robotic Manipulators", International Conference on Robotics and Automation, May 2012.

Anderson-Sprecher, "Intelligent Monitoring of Assembly Operations", Master's Thesis, tech. report CMU-RI-TR-12-03, Robotics Institute, Carnegie Mellon University, Jun. 2011.

(56) References Cited

OTHER PUBLICATIONS

Anderson-Sprecher et al., "Background Subtraction and Accessibility Analysis in Evidence Grids", Proceedings of 2011 IEEE International Conference on Robotics and Automation (ICRA 2011), May 2011.

\* cited by examiner

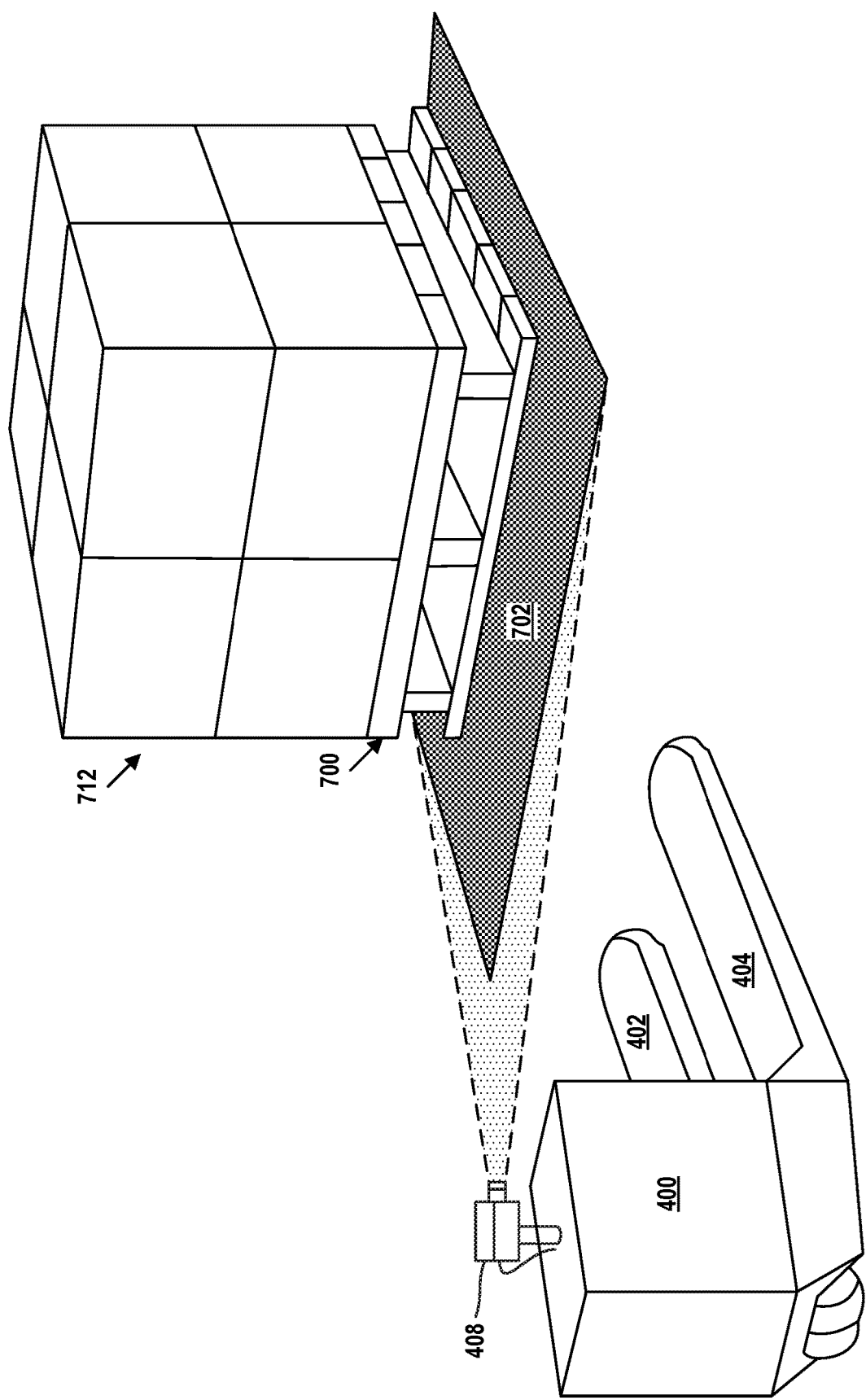

VISUALLY INDICATING VEHICLE CAUTION REGIONS

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, which are flat transport structures that contain stacks of boxes or other objects thereon. Additionally, the warehouse may use machines or vehicles for lifting and moving goods or pallets of goods, such as cranes, forklifts, and pallet jacks. Human operators may be employed to operate machines, vehicles, and other equipment. In some cases, one or more of the machines or vehicles may be robotic devices guided by computer control systems.

SUMMARY

In an example embodiment, visual indications may be projected onto an environment in which a robotic device is operating alongside human workers to inform the human workers of potentially dangerous areas and locations. The potentially dangerous areas, or caution regions, may arise when the robotic device moves close to an object in the environment, such as a wall, pallet rack, or pallet, and thus creates a pinch zone between the vehicle and the object. Expected caution regions may be determined before they arise by analyzing the proximity between objects in the environment and areas to which the robotic device is planned to move. A projector on the vehicle may be used to illuminate surfaces of the environment in and around the caution regions to visually indicate areas that human workers should avoid. The visual indications may remain fixed with respect to the object and as the robotic device moves around, thus consistently highlighting the caution region regardless of current vehicle position. The visual indications may be used to replace physically painted or taped lines in a warehouse environment.

In a first embodiment, a system is provided that includes a vehicle, a light projector connected to the vehicle, and a control system. The control system is configured to determine a planned operating region for the vehicle within an environment. The control system is also configured to determine that the planned operating region is within a threshold distance of an object within the environment and, in response, determine a caution region to illuminate with the light projector near the object. The control system is further configured to cause the light projector to project an indication of the caution region near the object. The projected indication remains fixed in relation to the object as the vehicle moves toward the planned operating region.

In a second embodiment, a method is provided that includes determining a planned operating region for a vehicle within an environment. The method also includes determining that the planned operating region is within a threshold distance of an object within the environment and, in response, determining a caution region to illuminate with a light projector near the object, where the light projector is connected to the vehicle. The method further includes causing the light projector to project an indication of the caution region near the object, where the projected indication remains fixed in relation to the object as the vehicle moves toward the planned operating region.

In a third embodiment, a non-transitory computer readable storage medium is provided having stored thereon instructions that, when executed by a computing device, cause the computing device to perform operations. The operations include determining a planned operating region for a vehicle within an environment. The operations also include determining that the planned operating region is within a threshold distance of an object within the environment and, in response, determining a caution region to illuminate with a light projector near the object, where the light projector is connected to the vehicle. The operations further include causing the light projector to project an indication of the caution region near the object, where the projected indication remains fixed in relation to the object as the vehicle moves toward the planned operating region In a fourth embodiment, a system is provided that includes means for determining a planned operating region for a vehicle within an environment. The system also includes means for determining that the planned operating region is within a threshold distance of an object within the environment. The system additionally includes means for, in response to determining that the planned operating region is within the threshold distance of the object, determining a caution region to illuminate with a light projector near the object, where the light projector is connected to the vehicle. The system yet further includes means for causing the light projector to project an indication of the caution region near the object, where the projected indication remains fixed in relation to the object as the vehicle moves toward the planned operating region.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7D illustrates a three-dimensional view of an indication of a caution region, in accordance with example embodiments.

DETAILED DESCRIPTION

Figure 1:
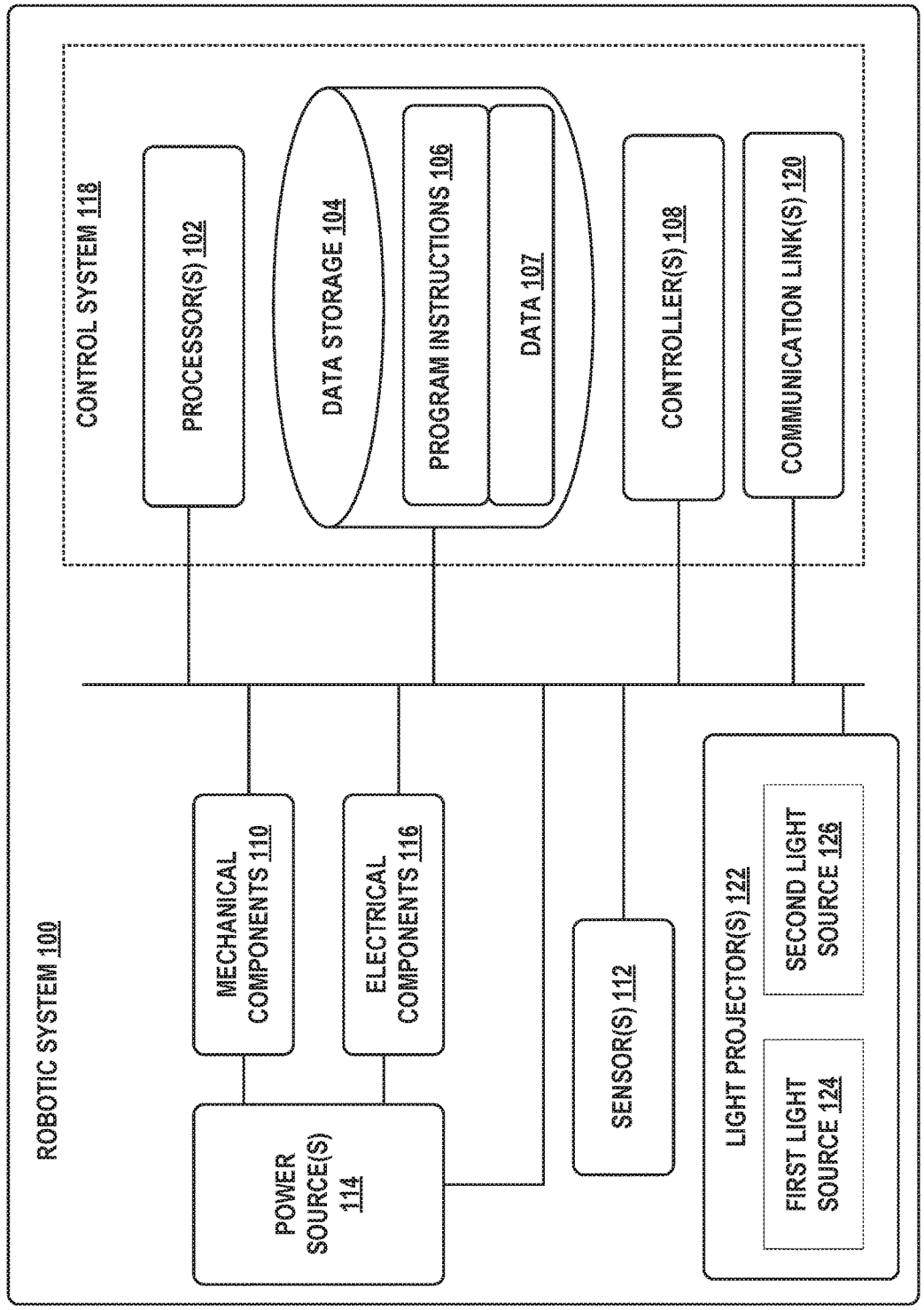
FIG. 1 illustrates a block diagram of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

Autonomous robotic devices may be used to carry out tasks and actions in an environment such as a warehouse without the need for constant human control. In some instances, the robotic devices may operate alongside human workers. Such a shared environment may arise, for example, when a warehouse utilizing human-operated vehicles transitions to using autonomously operated vehicles to handle its inventory. Measures may be taken to ensure that the human workers and the robotic devices safely cooperate with one another in the shared environment.

One such safety measure may involve classifying areas of the environment into safe and unsafe regions and projecting onto these regions corresponding visual indications to inform the human occupants of where they should position themselves to avoid the unsafe areas. The classification of the areas may be dynamic, that is, it may change over time based on, for example, a task that a vehicle is performing or is planned to perform, or an area that the vehicle is occupying or is planned to occupy, among other factors. This is in contrast to the conventional practice of painting or taping fixed lines on the floor of the warehouse to delineate the different areas therein, which does not allow for the shapes and sizes of the areas to quickly change depending on what is going on within the environment at the time.

The classifications may include areas within object safety thresholds, planned operating regions, caution regions, and safety regions, among other possibilities. An object safety threshold may be a distance away from a perimeter of an object within the environment that delineates a buffer region around the object. The object safety threshold may be defined by a warehouse safety standard and would ordinarily be indicated with fixed lines painted or taped on the floor around the object.

A planned operating region may include an area within the environment planned to be occupied by the vehicle within a future period of time (e.g., in the next 30 seconds). The planned operating region may be determined based on a plurality of vehicle footprints representing areas within the environment planned to be occupied by the vehicle as it moves along a path. The path may be determined for the vehicle by a control system on the vehicle (i.e., a same control system could both plan the path and control projection of the visual indications), or a centralized control system remote from the vehicle and configured to synchronize operations of multiple vehicles within the environment.

A caution region may arise when the planned operating region intersects with an area within the object safety threshold. That is, the caution region may indicate areas within the environment where the vehicle is planned to come within the object safety threshold of an object, thus creating a low-escape or pinch zone. The caution region may be larger than the intersection between the planned operating region and the area within the object safety threshold, extending, for example, from the intersection to the perimeter of the object. Determining caution regions may allow vehicles to more safely operate in tight areas and maneuver closely to objects because the visual indications ensure that such areas are likely to be free of occupants.

For example, in a warehouse setting, caution regions may arise in deep aisles of the warehouse, as well as when a vehicle is loading or unloading objects from the bottom level of racks. In deep aisles and bottom rack levels, escape routes might not be available or might be difficult to identify for human occupants of the warehouse. The approach herein described may provide a way to reduce the risk of a human occupant inadvertently going to an area without an escape route by illuminating any caution regions before the vehicle moves into or near the caution regions. Thus, the approach herein described may allow vehicles to meet levels of safety regulations or safety standards that the vehicle might not otherwise meet.

Safety regions may include any areas of the environment that are not planned to be occupied by vehicles within the future period of time and are not within the object safety threshold of an object. That is, safety regions may be occupied by human workers without significant risk of a vehicle coming near them (e.g., within 50 centimeters). Whether a region is determined as safe may be based on any safety standard for the application in which the vehicle is used or on values or parameters defined by a user or operator of the vehicle. The caution regions and safety regions may change over time as the vehicle performs different tasks in different regions of the environment.

The vehicle may be equipped with projectors to project, onto the environment, visual indications of the classified regions. Projectors may be mounted on the top, front, back, sides of, and/or underneath the vehicle, and may be moveable or fixed with respect to the vehicle. The visual indications, when projected onto the environment, may delineate or span an entirety of the classified areas. That is, a visual indication delineating a caution region may illuminate an area within the environment that is at least as large as and includes therein the caution region. Alternatively, visual indication delineating the caution region may illuminate a border within the environment that encircles the caution region. However, the area within the environment illuminated by the projector may also be smaller than the caution region and might not overlap with the caution region. Rather, the projector may illuminate an area in the direction and general vicinity of the caution region.

As the vehicle moves through the environment, positions and orientations of the projectors may be adjusted to maintain the different indicated regions in a fixed position in relation to objects within the environment. That is, although the vehicle may move through the environment, the control system may operate to keep the projected visual indications stationary or fixed in the environment. For example, the control system may control the projector to project a visual indication of a caution region around a stationary pallet onto a fixed portion of a floor of the warehouse around the pallet regardless of movements of the vehicle. In some instances, however, the actual position of the projected visual indications may vary from the planned or expected position of the visual indications due to, for example, delay in physically reorienting the projector, limitations in capabilities of the projector, and/or occlusions along the path of projected light. The control system may operate to minimize an error or difference between the planned position of the visual indications and the actual position thereof.

Further, as the vehicle moves and the relative position and orientation between the projectors and the environment changes, the control system may determine keystone corrections to apply to the visual indications such that their appearance on surfaces in the environment does not vary as the vehicle moves. Additionally, the projections may be updated as the different regions and their positions in the environment change over time. For example, a caution region may be illuminated before it is occupied by the vehicle, but may cease to be illuminated after the vehicle clears the caution region.

Successful projection of the visual indications onto the environment may be verified by capturing and analyzing images of the environment. The images and/or other sensor data may be used to determine whether any human workers currently occupy or are expected to occupy any of the caution regions. Additional warnings may be provided to compel human workers to exit or avoid any caution regions. For example, an escape route for the human worker may be determined and projected onto the environment, allowing the human worker to easily avoid the vehicle and the caution region. The vehicle may be configured to stop and wait for any human workers to move to a safe location before entering any caution regions.

II. EXAMPLE ROBOTIC SYSTEMS

Referring now to the Figures, FIG. 1 illustrates an example configuration of a robotic system that may be used in connection with the embodiments described herein. Robotic system 100 may be configured to operate autonomously, semi-autonomously, or using directions provided by user(s). Robotic system 100 may be a vehicle implemented in various forms, such as forklifts, pallet jacks, cars, trucks, motorcycles, buses, boats, airplanes, helicopters, lawn mowers, earth movers, boats, snowmobiles, aircraft, recreational vehicles, amusement park vehicles, farm equipment, construction equipment, warehouse equipment, trams, golf carts, trains, and trolleys. Other forms are possible as well. Furthermore, robotic system 100 may also be referred to as a robot, robotic device, mobile robot, or robotic vehicle, among other designations.

As shown in FIG. 1, robotic system 100 may include processor(s) 102, data storage 104, and controller(s) 108, which together may be part of a control system 118. Robotic system 100 may also include sensor(s) 112, power source(s) 114, mechanical components 110, electrical components 116, communication link(s) 120, and light projector(s) 122. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, electrical components 116, communication link(s) 120, or light projector(s) 122.

Data storage 104 may be one or more types of hardware memory. For example, data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, data storage 104 can be a single physical device. In other embodiments, data storage 104 can be implemented using two or more physical devices, which may communicate with one another via wired or wireless communication. As noted previously, data storage 104 may include computer-readable program instructions 106 and data 107. Data 107 may be any type of data, such as configuration data, sensor data, and/or diagnostic data, among other possibilities.

Controller 108 may include one or more electrical circuits, units of digital logic, computer chips, and/or microprocessors that are configured to (perhaps among other tasks) interface between any combination of mechanical components 110, sensor(s) 112, power source(s) 114, electrical components 116, control system 118, communication link(s) 120, light projector(s) 122, users of robotic system 100. In some embodiments, controller 108 may be a purpose-built embedded device for performing specific operations with one or more subsystems of robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. For instance, control system 118 may include various components for communicating with robotic system 100, including a joystick, buttons, and/or ports, etc. The example interfaces and communications noted above may be implemented via a wired or wireless connection, or both. Control system 118 may perform other operations for robotic system 100 as well.

In some implementations, control system 118 of robotic system 100 may also include communication link(s) 120 configured to send and receive information. Communication link(s) 120 may transmit data indicating the state of the various components of robotic system 100. For example, information read by sensor(s) 112 may be transmitted via communication link(s) 120 to a separate device. Other diagnostic information indicating the integrity or health of power source(s) 114, mechanical components 110, electrical components 116, processor(s) 102, data storage 104, light projector(s) 122, or controller 108 may be transmitted via communication link(s) 120 to an external communication device.

In some implementations, robotic system 100 may receive information at communication link(s) 120 that is then processed by processor(s) 102. The received information may indicate data that is accessible by processor(s) 102 during execution of program instructions 106. Further, the received information may change aspects of controller(s) 108 that may affect the behavior of mechanical components 110 or electrical components 116. In some cases, the received information may indicate a query requesting a piece of information (e.g. the operational state of one or more of the components of robotic system 100). Processor(s) 102 may subsequently transmit the piece of information back out via communication link(s) 120.

In some cases, communication link(s) 120 may include a wired connection. Robotic system 100 may include one or more ports to interface communication link(s) 120 to an external device. Communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, control system 118 may communicate with other systems of robotic system 100 via wired or wireless connections, and may further be configured to communicate with one or more users or operators of the vehicle. As one possible illustration, control system 118 may receive an input (e.g., from a user or from another vehicle) indicating an instruction to move a pallet from a first location of a warehouse to a second location of the warehouse. The input to control system 118 may be received via communication link(s) 120.

Based on this input, control system 118 may perform operations to cause robotic system 100 to use sensors 112 to analyze the environment of the warehouse to locate the pallet and subsequently use mechanical components 110 to pick up and move the pallet.

Operations of control system 118 may be carried out by processor(s) 102. Alternatively, these operations may be carried out by controller 108, or a combination of processor(s) 102 and controller 108. In some embodiments, control system 118 may partially or wholly reside on a device other than robotic system 100, and therefore may at least in part control robotic system 100 remotely. Communication link(s) 120 may be used at least in part to carry out the remote communication.

Mechanical components 110 represent hardware of robotic system 100 that may enable robotic system 100 to perform physical operations. As a few examples, robotic system 100 may include physical members such robotic arm(s), wheel(s), track(s), linkage(s), and/or end effector(s). The physical members or other parts of robotic system 100 may further include motors and actuators arranged to move the physical members in relation to one another. Robotic system 100 may also include one or more structured bodies for housing control system 118 or other components, and may further include other types of mechanical components. Mechanical components 110 used in a given robot may vary based on the design of the robot, and may also be based on the operations and/or tasks the robot may be configured to perform.

In some examples, mechanical components 110 may include one or more removable components. Robotic system 100 may be configured to add and/or remove such removable components, which may involve assistance from a user and/or another robot. For example, robotic system 100 may be configured with removable arms, linkages, and/or end effectors so that these members can be replaced or changed as needed or desired based on a task robotic system 100 is expected or planned to perform. In some embodiments, robotic system 100 may include one or more removable and/or replaceable battery units or sensors. Other types of removable components may be included within some embodiments.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras (e.g., a depth camera and/or a stereo camera), among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment, location and/or identity of nearby objects (e.g., pallets, environmental landmarks), which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for three-dimensional (3D) vision), a global positioning system (GPS) transceiver, and/or other sensors for capturing information of the environment in which robotic system 100 is operating. Sensor(s) 112 may monitor the environment in real time, and detect obstacles, elements of the terrain, weather conditions, temperature, and/or other aspects of the environment.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such the operation of wheels, linkages, actuators, end effectors, and/or other mechanical and/or electrical features of robotic system 100. The data provided by sensor(s) 112 may enable control system 118 to determine errors in operation as well as monitor overall operation of components of robotic system 100.

As an example, robotic system 100 may use a time-of-flight (ToF) camera to scan portions of the environment to detect obstacles along a planned path of the vehicle, identify environmental landmarks within an environment of robotic system 100, and locate objects of interest, such as pallets or boxes. The ToF camera may have a limited field of view. Mechanical components 110 and electrical components 116 may work in coordination to move the ToF camera along a trajectory to direct a field of view of the ToF camera at different portions of the environment.

As another example, sensor(s) 112 may include one or more velocity and/or acceleration sensors. Sensor(s) 112 may measure both linear and angular velocity and/or acceleration. For instance, sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicated discussed herein. Additionally or alternatively, robotic system 100 may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, and/or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. In one example, the hydraulic fluid may be used to actuate the forks of a forklift, fork truck, and/or pallet jack. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, and/or providing electrical charge or electric signals. Among possible examples, electrical components 116 may include electrical wires, circuitry, and/or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to mechanical components 110, for example. Further, robotic system 100 may include electric motors. Other examples of electrical components 116 may exist as well.

Although not shown in FIG. 1, robotic system 100 may include a chassis and/or an operator cabin, which may connect to or house components of robotic system 100. The structure of the chassis and/or cabin may vary within examples and may further depend on operations that a given vehicle may have been designed to perform. For example, a vehicle developed to carry large, heavy loads may have a wide, rigid chassis that enables placement of the load. Similarly, a vehicle designed to carry light loads at high speeds may have a narrow, small chassis that does not have substantial weight. Further, the chassis, cabin, and/or the other components may be developed using various types of materials, such as metals or plastics. Within other examples, a vehicle may have a chassis with a different structure or made of various types of materials.

The chassis, cabin, and/or the other components may include or carry sensor(s) 112. These sensors may be positioned in various locations on robotic system 100, such as on top of the chassis to provide a high vantage point for sensor(s) 112.

Robotic system 100 may carry a load, such as a type of cargo that is to be transported. The load may also represent external batteries or other types of power sources (e.g., solar panels) that robotic system 100 may utilize. Carrying the load represents one example use for which robotic system 100 may be configured, but robotic system 100 may be configured to perform other operations as well.

Robotic system 100 may further include light projectors(s) 122 arranged to project light onto portions of the environment around robotic system 100. Light projector(s) 122 may include photo or video projectors (e.g., Digital Light Processing (DLP) projectors, Liquid Crystal Display (LCD) projectors, Liquid Crystal on Silicon (LCoS) projectors, Light-Emitting Diode (LED) projectors, or laser projectors), a holographic projector (accomplished by varying uses of lasers (e.g., plasma lasers), interference, diffraction, light intensity, and/or other parameters known or not yet known in the field of holography), parabolic aluminized reflector (PAR) lights, strip lights, spotlights, LCD's, LED's, or combinations thereof. Light projector(s) 122 may be connected to the chassis or cabin of robotic system 100, and may be configured to move with respect thereto in one or more degrees of freedom. For example, light projector(s) 122 may be configured to translate with respect to the chassis in one or more degrees of freedom (e.g., along the x-axis, y-axis, and/or z-axis) and to rotate with respect to the chassis in at least one degree of freedom (e.g., yaw, pitch, and/or roll). Movement of light projector(s) 122 with respect to the vehicle may allow different portions of the environment around the vehicle to be selectively illuminated by light projector(s) 122.

Figure 2:
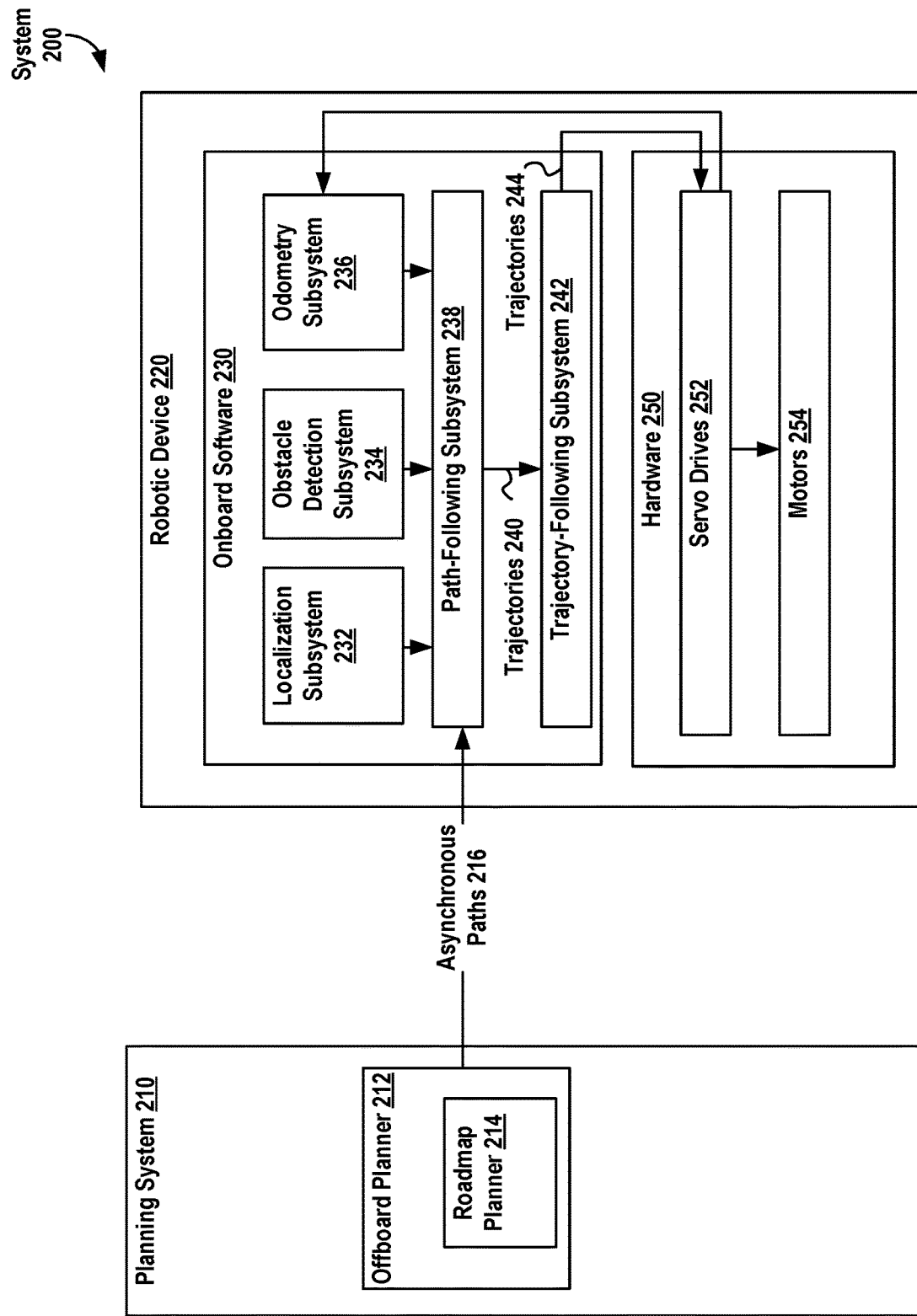
FIG. 2 illustrates a block diagram of a system, in accordance with example embodiments.

FIG. 2 is a block diagram of system 200, in accordance with example embodiments. System 200 includes planning system 210 and robotic device 220. Planning system 210 can include offboard planner 212 that can coordinate motion of one or more robotic devices operating in an environment. Offboard planner 212 can include roadmap planner 214. Offboard planner 212 and/or roadmap planner 214 can generate one or more asynchronous paths 216 for a robotic device, such as robotic device 220, to follow while operating in an environment.

A roadmap graph, prototype graph, or other roadmap representing an environment can be received, determined, or otherwise provided to planning system 210, offboard planner 212 and/or roadmap planner 214. Asynchronous paths 216 can be one or more paths based on the roadmap graph, prototype graph, or other roadmap. For example, if the roadmap graph, prototype graph, or other roadmap has a plurality of edges that connect a plurality of intersections, asynchronous paths 216 can be specified in terms of the plurality of edges and/or the plurality of intersections.

Robotic device 220 can include onboard software 230 and/or hardware 250. Robotic device 220 may represent robotic system 100, onboard software 230 may represent program instructions 106 and data 107, and hardware 250 may represent mechanical components 110 and electrical components 116. Onboard software 230 can include one or more of: localization subsystem 232, obstacle detection subsystem 234, odometry subsystem 236, path-following subsystem 238, and trajectory-following subsystem 242. Localization subsystem 232 can be used to localize a robotic device, that is, determine a location of the robotic device within an environment. Localization subsystem 232 can generate position estimates of the robotic device and/or other objects that can be used to localize the robotic device, assist the robotic device in following a path, such as asynchronous paths 216, and/or assist the robotic device in following a trajectory, such as trajectories 240. Once the position estimates are generated, localization subsystem 232 can provide the position estimates to path-following subsystem 238.

An asynchronous path, or path for short, can be a time-invariant plan or other information indicating how robotic device 220 can travel from a starting point SP to an ending point EP; i.e., an (asynchronous) path does not take time into account. In contrast, a trajectory can include values of a steering angle and of traction motor velocity that robotic device 220 can follow for a planning time interval.

The planning time interval can be a duration of time that a robotic device is guided, or planned to follow a path, route, and/or travel. In some embodiments, the planning time can be a predetermined amount of time; e.g., five seconds, one second, 0.2 seconds, or 0.1 seconds. For example, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 220 can travel from starting point SP to an ending point EP in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 220, and actuator positions of robotic device 220.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 234 can determine whether one or more obstacles are blocking a path and/or a trajectory of robotic device 220. Examples of these obstacles can include, but are not limited to, pallets, objects that may have fallen off a pallet, robotic devices, and human operators working in the environment. If an obstacle is detected, obstacle detection subsystem 234 can provide one or more communications indicating obstacle detection to path-following subsystem 238. The one or more communications indicating obstacle detection can include location information about one or more positions of one or more obstacles detected by obstacle detection subsystem 234 and/or identification information about the one or more obstacles detected by obstacle detection subsystem 234. Odometry subsystem 236 can use data, such as data from servo drives 252, to estimate one or more changes in position of robotic device 220 over time.

Path-following subsystem 238 and/or trajectory-following subsystem 242 can act as a planner aboard robotic device 220. This onboard planner can follow one or more paths, such as asynchronous paths 216, based on position estimates provided by localization subsystem 232.

Path-following subsystem 238 can receive asynchronous paths 216, position estimate inputs from localization subsystem 232, location information about one or more positions of one or more obstacles from obstacle detection subsystem 234, and/or information about one or more changes in position from odometry subsystem 236, and generate one or more trajectories 240 as outputs.

Hardware 250 can include servo drives 252 and/or motors 254. Servo drives 252 can include one or more servo drives. Servo drives 252 can include an electronic amplifier used to power one or more servomechanisms and/or can monitor feedback signals from the servomechanism(s). Servo drives 252 can receive control signals, such as trajectories 244, from onboard software 230, and can provide electric current to the servomechanism(s) to produce motion proportional to the control signals. In some embodiments, servo drives 252 can compare status information received from the servomechanism(s) with an expected status as commanded by trajectories 244. Then, servo drives 252 can adjust a voltage frequency or pulse width of the provided electric current to correct for deviations between received status information and an expected status. In other embodiments, servo drives 252 can provide information, such as the feedback signals and/or location-related information, to onboard software 230.

One or more motors 254 can be part or all of the servomechanism(s) powered by servo drives 252. For example, motors 254 can use the electric current provided by servo drives 252 to generate mechanical force to drive part or all of robotic device 220; e.g., motors 254 can provide force to propel robotic device 220 and/or drive one or more effectors of robotic device 220.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

III. EXAMPLE VEHICLES

Figure 3A:
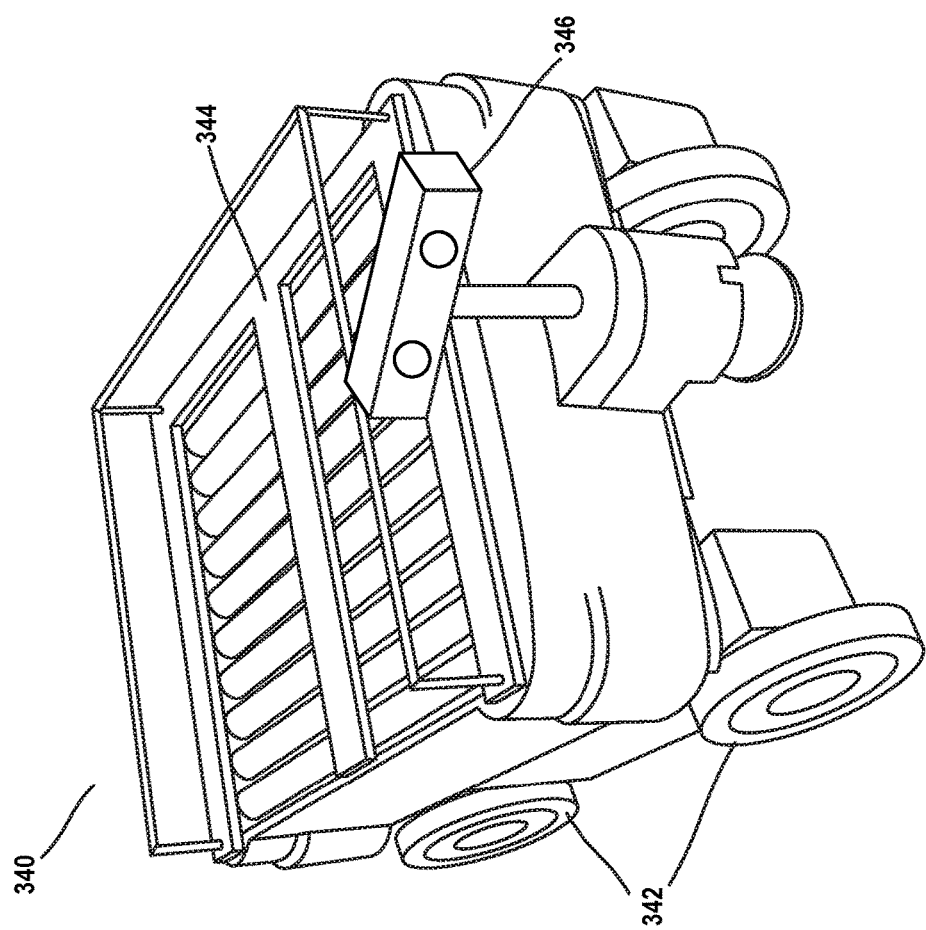
FIG. 3A illustrates an autonomous guided vehicle, in accordance with example embodiments.
Figure 3B:
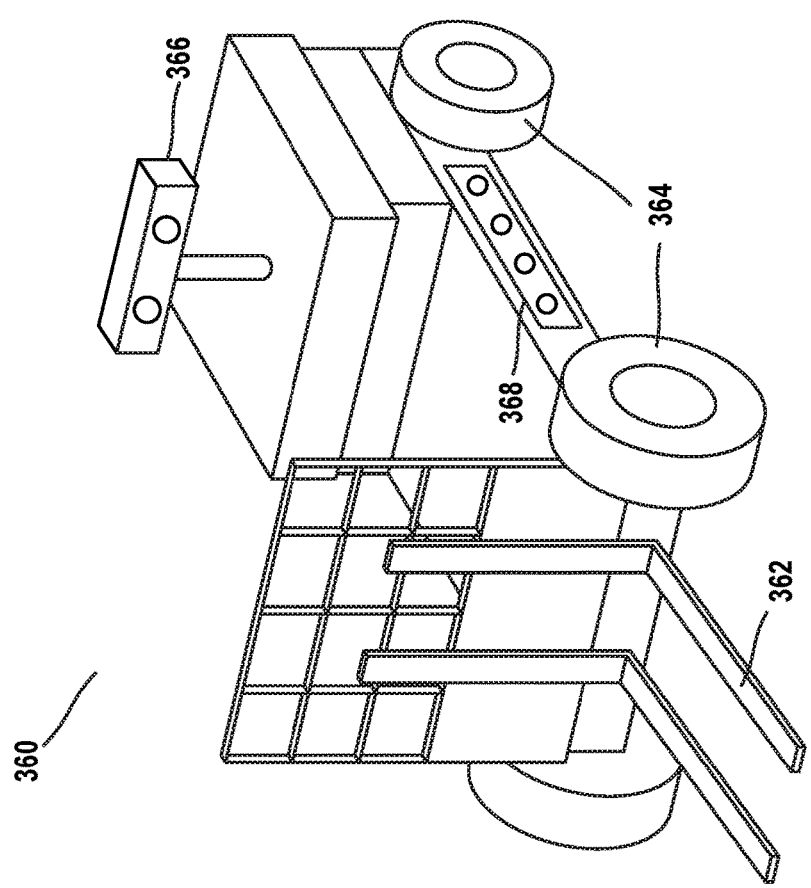
FIG. 3B illustrates an autonomous fork truck, in accordance with example embodiments.

FIGS. 3A and 3B illustrate example vehicles that may embody robotic system 100 and/or robotic device 220. Other vehicles which vary in form from those illustrated here as well as other types of robotic devices may also be included.

FIG. 3A shows an autonomous guided vehicle (AGV), according to an example embodiment. More specifically, AGV 340 may be a relatively small, mobile robotic device that is capable of transporting individual boxes or cases. AGV 340 may include wheels 342 to allow for locomotion within a warehouse environment. Additionally, top surface 344 of AGV 340 may be used to places boxes or other objects for transport. In some examples, top surface 344 may include rotating conveyors to move objects to or from AGV 340.

AGV 340 may include sensors connected to AGV 340 and configured to move with respect to AGV 340 to observe different portions of the environment (e.g., rotate and/or translate with respect to AGV 340). AGV 340 may also include connected thereto projector 346 configured to move with respect to AGV 340 much like the sensors. In some example implementations, projector 346 may be connected to a different portion of AGV 340 than shown in FIG. 3A. AGV 340 may also include fixed and/or movable projectors (not shown) mounted to the front, back, and sides thereof.

In additional examples, AGV 340 may be powered by one or more batteries that can be quickly recharged at a battery charging station and/or exchanged for fresh batteries at a battery exchange station. In further examples, AGV 340 may additionally include other components not specifically identified here, such as sensors for navigation. AGVs with different shapes and sizes also may be included within a robotic warehouse fleet, possibly depending on the types of packages handled by a warehouse.

FIG. 3B shows an autonomous fork truck, according to an example embodiment. More specifically, autonomous fork truck 360 may include forklift 362 for lifting and/or moving pallets of boxes or other larger materials. In some examples, forklift 362 may be elevated to reach different racks of a storage rack or other fixed storage structure within a warehouse. Autonomous fork truck 360 may additionally include wheels 364 for locomotion to transport pallets within the warehouse. In additional examples, the autonomous fork truck may include a motor and power supply as well as a sensing system. Autonomous fork truck 360 may also vary in size or shape from the one illustrated in FIG. 3B.

Further, autonomous fork truck 360 may include projector 366 configured to move (e.g., rotate and/or translate) with respect to autonomous fork truck 360 to project visual indications onto different portions of the environment. In some embodiments, projector 366 may be connected to a different portion of autonomous fork truck 360 than shown in FIG. 3B. Autonomous fork truck 360 may also include projector 368 mounted to a side thereof, which may be fixed or movable, as well as similar projector mounted to the front, rear, and other side of autonomous fork truck 360.

Any of the robotic devices described herein may include one or more sensor(s) such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, audio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) may provide sensor data to a processor(s) to allow for appropriate interaction of a robotic device with the environment. Additionally, a robotic device may also include one or more power source(s) configured to supply power to various components of the robotic device. Any type of power source may be used such as, for example, a gasoline engine or a battery.

IV. CAUTION REGION DETECTION AND PROJECTION

Figure 4A:
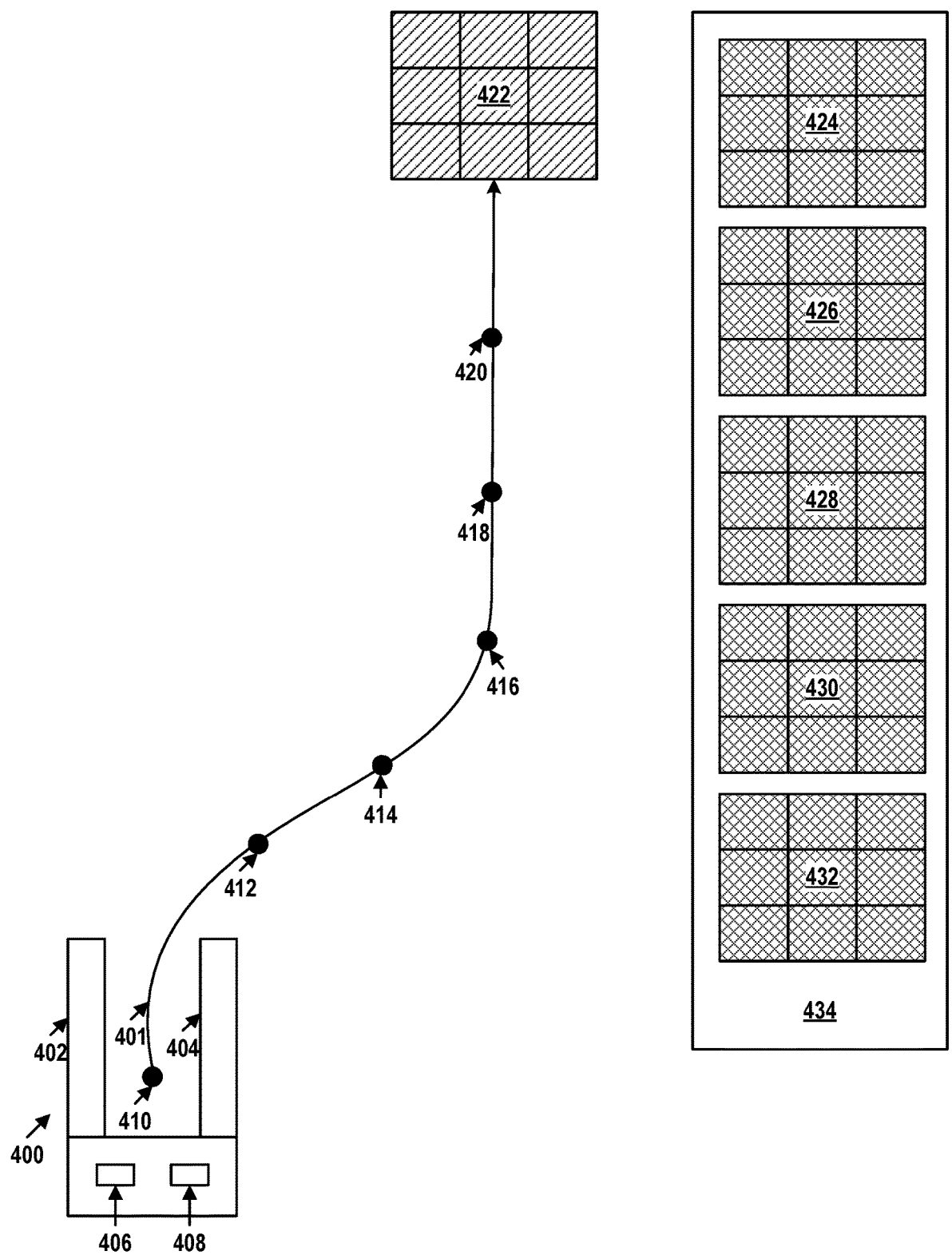
FIG. 4A illustrates a path through an environment, in accordance with example embodiments.

FIGS. 4A-4H indicate example operations for identifying and projecting visual indications of caution regions in an environment. FIG. 4A illustrates a top-down view of vehicle 400 and path 401 determined for vehicle 400 to follow through an environment. The environment includes therein pallet 422 and a pallet rack 434 onto which pallets 424, 426, 428, 430, and 432 are stacked.

Vehicle 400 may be a pallet jack or fork truck having tines 402 and 404. Tines 402 and 404 may allow vehicle 400 to interact with pallets 422-432, or other storage structures, by placing the tines into slots within the pallet, thereby enabling pick-up, transportation, and drop-off of the pallet. Vehicle 400 may also include sensor 406 for scanning the environment, allowing for vehicle localization and obstacle detection within the environment, among other operations. Vehicle 400 may further include projector 408 for projecting visual indications onto the environment.

Path 401 may run from (or may form part of a path running from) a starting position within the environment to target position within the environment. Path 401 may be planned around known or fixed obstacles (e.g., walls) in the environment based on kinematic and dynamic properties of vehicle 400. Path 401 may be made up of a plurality of discrete ordered positions 410, 412, 414, 416, 418, and 420 (i.e., positions 410-420). Positions 410-420 may be target positions for vehicle 400 to follow in sequence to move along path 401. Before or while causing vehicle 400 to move along path 401, the control system may analyze path 401 to determine whether any caution regions will arise as a result of vehicle 400 moving therealong, and may cause projector 408 to project indications of any of these caution regions onto the environment.

In order to determine the caution regions, the control system may first determine a planned operating region for vehicle 400. The planned operating region may be, for example, an area within the environment planned to be occupied by vehicle 400 during a period of time (e.g., next 30 seconds). Thus, the control system may determine, for each respective position of positions 410-420 along path 401, a vehicle footprint indicating an area within the environment planned to be occupied by vehicle 400 at the respective position.

Figure 4B:
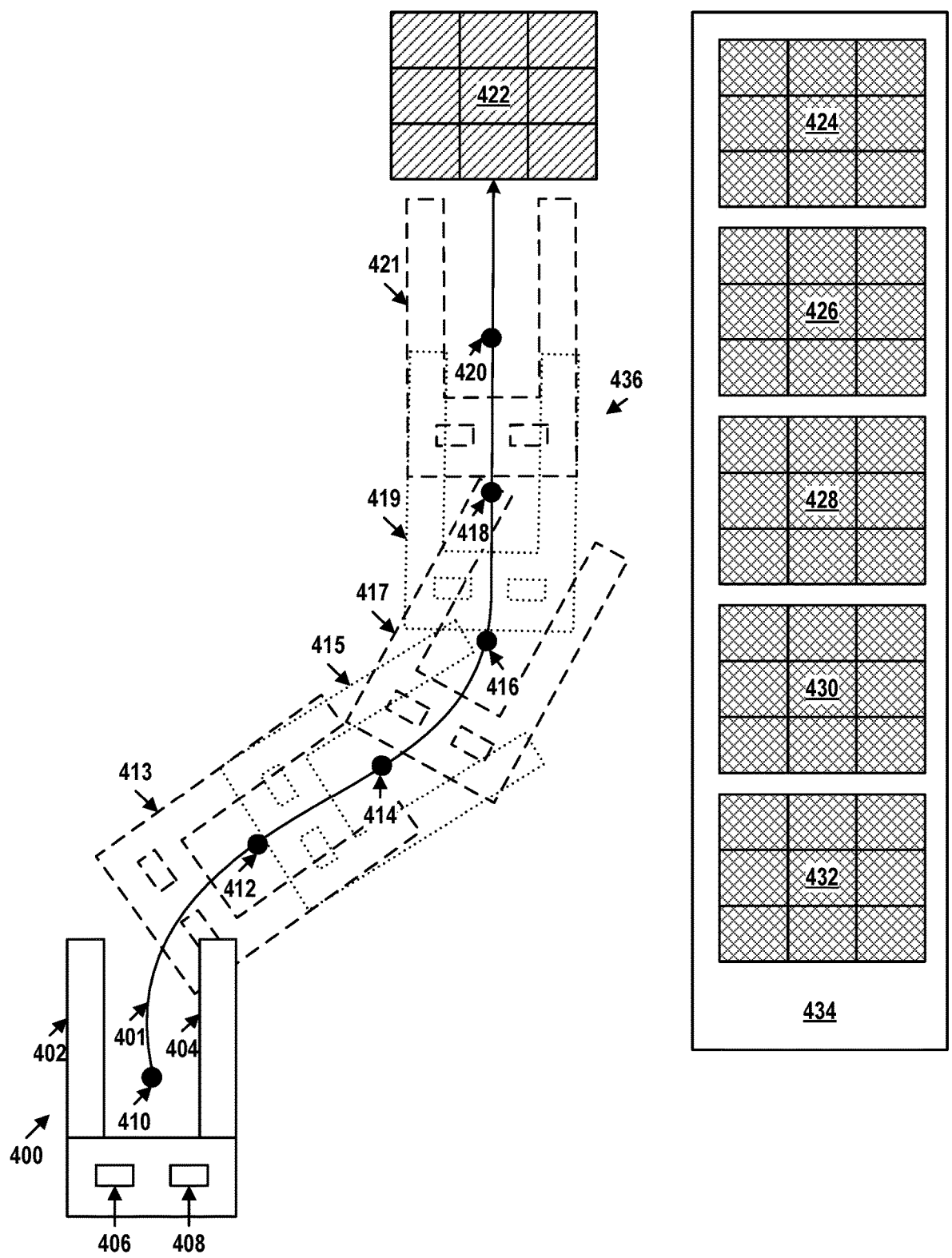
FIG. 4B illustrates vehicle footprints, in accordance with example embodiments.

FIG. 4B illustrates a plurality of vehicle footprints 413, 415, 417, 419, and 421 (i.e., footprints 413-421) projected along path 401 at corresponding positions 412, 414, 416, 418, and 420, respectively. Footprints 413-421 are shown with alternating line patterns for clarity. Each of footprints 413-421 indicates the area within the environment, or within the map representing the environment, that is planned to be occupied by vehicle 400 when vehicle 400 (e.g., the centroid of vehicle 400) is at the respective position along path 401. Footprint 413, for example, represents a first area within the environment planned to be occupied by vehicle 400 when the centroid of vehicle 400 reaches position 412, while footprint 415 represents a second area within the environment planned to be occupied by vehicle 400 when the centroid of vehicle 400 reaches position 414, and so on.

In some embodiments, the map may be represented as an occupancy grid that includes a number of cells that represent corresponding areas in the environment. Each cell may be assigned a state that indicates the status of the area represented by the cell. Particularly, a cell may be assigned as having an obstacle, free space, or unknown. Cells with obstacles may represent physical features within the environment, including fixed, movable, and mobile objects. Cells with free space may be traversable by the vehicle without striking objects in the environment. Unknown cells may require additional sensor data to determine whether the area includes an obstacle or not (i.e., has free space). The control system (e.g., local or remote) may periodically update and adjust the occupancy grid based on new measurements of the environment from sensors coupled to one or more vehicles navigating the environment.

The pose (i.e., position and orientation) of footprints 413-421 may be determined based on the physical size of vehicle 400 (e.g., mass and volume), as well as the steering angles and velocities planned to be commanded to vehicle 400 to cause vehicle 400 to follow path 401. In some embodiments, each footprint, in addition to representing the area in the environment expected to be occupied by the vehicle, may include a buffer region around the area. For example, each footprint might be 10% larger than an actual physical size of vehicle 400 to account for errors in sensing, vehicle positioning, and simulation, among others. In some embodiments, the density of positions 410-420, and thus the density of footprints 413-421, may be greater or smaller than that shown in FIGS. 4A-4H.

Figure 4C:
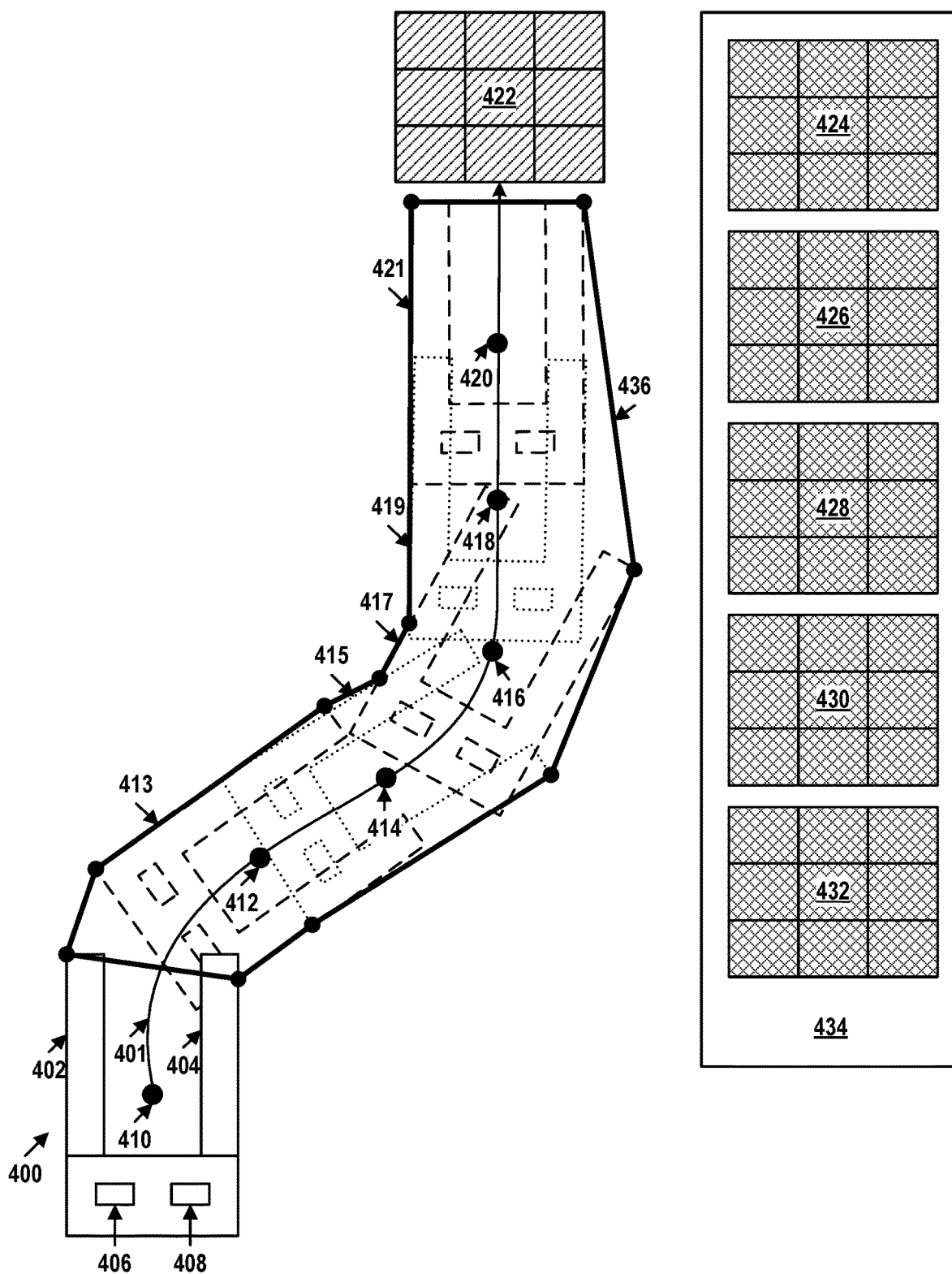
FIG. 4C illustrates a planned operating region, in accordance with example embodiments.

Planned operating region 436 may be determined by fitting a boundary to a union of footprints 413-421, as illustrated in FIG. 4C. Planned operating region 436 may be defined by an area enclosed by the boundary and may represent regions likely to be occupied by vehicle 400 within a future time period. A caution region may be detected by determining whether planned operating region 436 intersects with threshold areas around any obstacles within the environment.

In some implementations, footprints 413-421 and planned operating region 436 may be determined after determining path 401 (or a longer path of which path 401 is a part) but before vehicle 400 is caused to move along path 401. Alternatively, footprints 413-421 and planned operating region 436 may be determined after determining path 401 and while vehicle 400 moves along path 401. Similarly, caution regions may be detected before or while vehicle 400 moves along path 401. For example, caution regions arising due to fixed objects within the environment may be determined before vehicle 400 is caused to follow path 401, while caution regions arising due to non-fixed (e.g., moveable or mobile) objects may be determined while vehicle 400 moves along path 401 (i.e., when the non-fixed objects come into view of a sensor on vehicle 400).

Figure 4D:
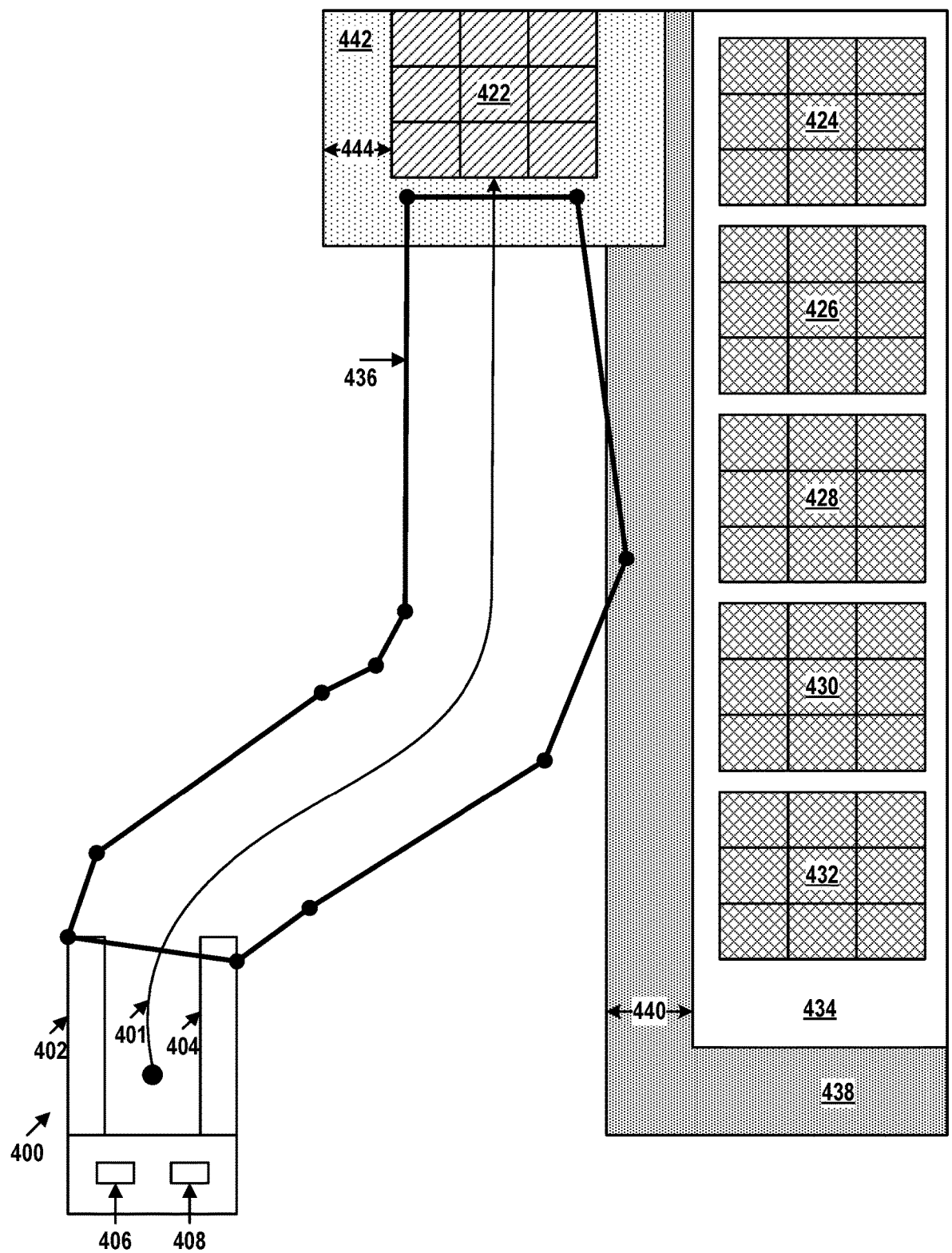
FIG. 4D illustrates threshold distances and threshold areas, in accordance with example embodiments.

FIG. 4D illustrates threshold area 438 around pallet rack 434 and threshold area 442 around pallet 422. Threshold area 438 may be defined as an area located within threshold distance 440 of a perimeter of pallet rack 434. Similarly, threshold area 442 may be defined as an area located within threshold distance 444 of a perimeter of pallet 422. Threshold distances 440 and 444 may be referred to as object safety thresholds. In some embodiments, threshold distances 440 and 444 may be defined by a safety standard for a workspace in which robotic devices work alongside humans. In some implementations, threshold distances greater than those defined by the safety standard may be used.

The threshold distances may be fixed, or may be dynamically sized based on a classification or type of object (e.g., whether the object is fixed, movable, or moving), a size of the object, a type of vehicle, or a speed with which the vehicle is traveling, among other factors. For example, threshold distance 444 around pallet 422 may be greater than threshold distance 440 around pallet rack 434 because pallet 422 is movable and pallet rack 434 is fixed. In another example, threshold distance 440 may be increased in proportion to increases in speed of vehicle 400. In some embodiments, a maximum speed of vehicle 400 may be limited when vehicle 400 enters into threshold areas 438 or 442.

Figure 4E:
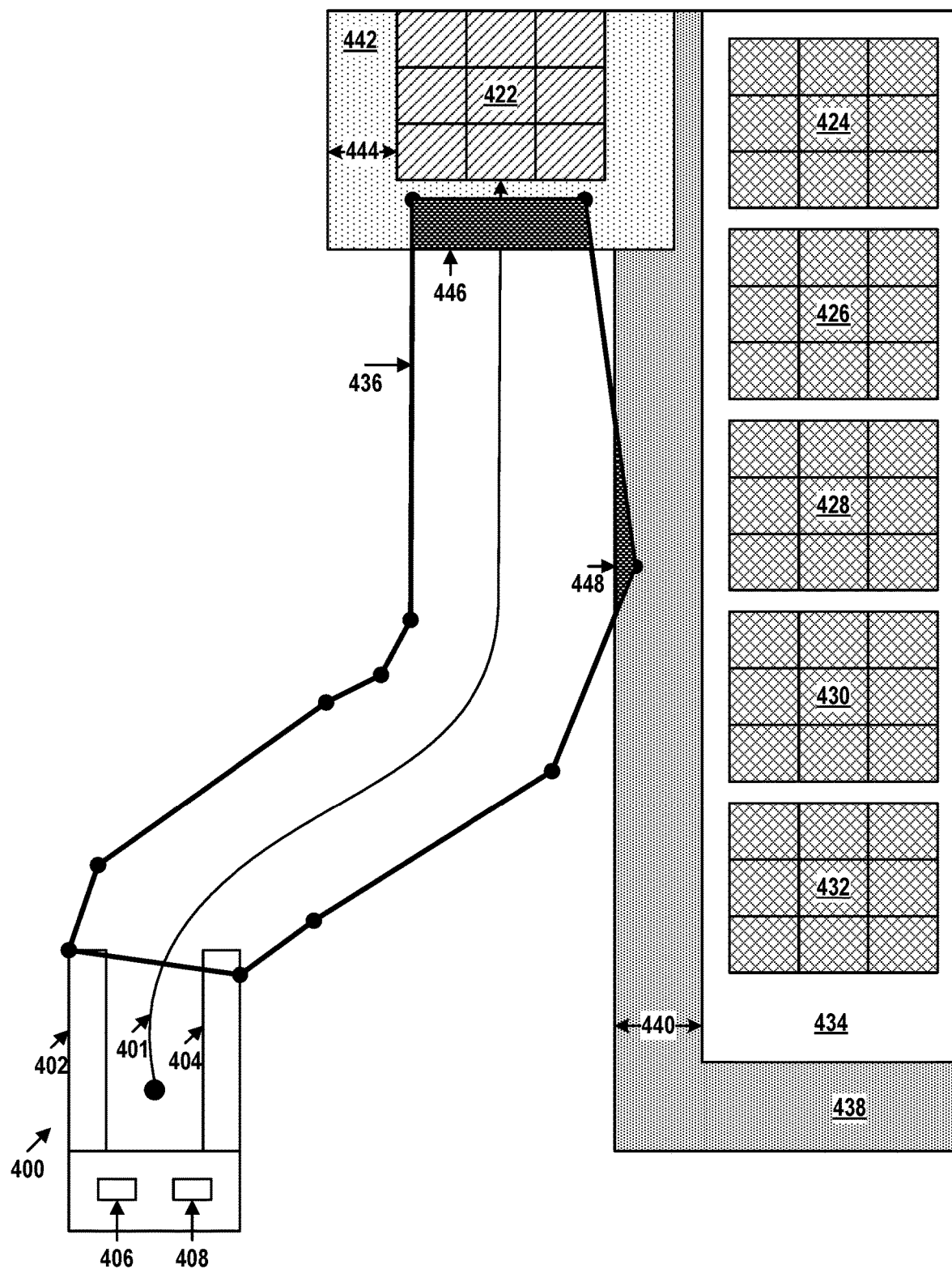
FIG. 4E illustrates intersections between the planned operating region and the threshold areas, in accordance with example embodiments.

FIG. 4E illustrates intersection 448 between threshold area 438 and planned operating region 436, as well as intersection 446 between threshold area 442 and planned operating region 436. Intersections 446 and 448 indicate regions of the environment where vehicle 400 is planned to cross into threshold areas 438 and 442, respectively, while following path 401. Intersection 446 may arise because vehicle 400 may be planned to pick up pallet 422. An additional intersection may arise between another planned operating region and threshold area 438 as vehicle 400 loads pallet 422 onto pallet rack 434. A caution region may be determined based on each of intersections 446 and 448.

Figure 4F:
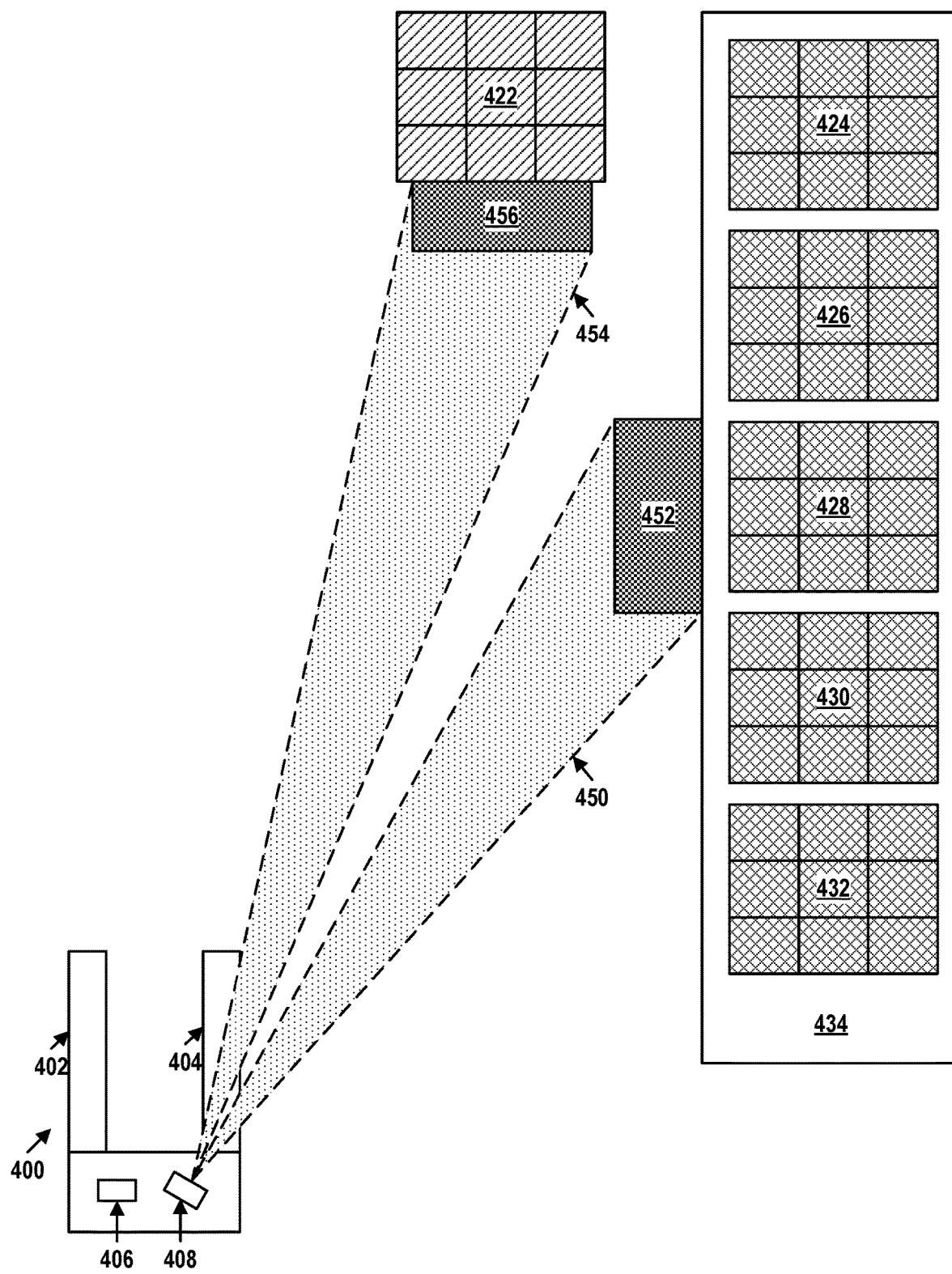
FIG. 4F illustrates indications of caution regions, in accordance with example embodiments.

FIG. 4F illustrates caution regions 452 and 456 determined based on intersections 446 and 448, respectively. Caution region 452 may be determined by extending intersection 448 horizontally towards pallet rack 434. Caution region 456 may be determined by extending intersection 446 vertically towards pallet 422.

In some embodiments, caution regions 452 and 456 may be smaller, larger, and/or may have a different shape than shown in FIG. 4F. For example, caution regions 452 and 456 may span the same area as intersections 448 and 446. In another example, caution regions 452 and 456 may include circles circumscribed around intersections 448 and 446. In some embodiments, the shape, size, and other aspects of the caution regions may be defined by the safety standard. For example, when no good escape area/route exists for an occupant due to a vehicle's position in the environment, the caution region might have a different size or shape than when there is an area or route for the occupant to avoid the vehicle. Caution regions 452 and 456 may be indicated in the occupancy grid by assigning to corresponding cells of the occupancy grid a "caution" state.

Projector 408 of vehicle 400 may project visual indications of caution regions 452 and 456, as indicated by light beams 450 and 454. A pose (i.e., orientation and position) of projector 408 relative to vehicle 400 to direct beams 450 and 454 onto caution regions 452 and 456, respectively, may be determined and projector 408 may be positioned accordingly, as shown in FIG. 4F. The visual indications may contain patterns, text, and/or images that communicate to occupants of the environment that vehicle 400 is planned to come within threshold distance 444 of pallet 422 and threshold distance 440 of pallet rack 434. Thus, the visual indications may operate to compel occupants of the environment to avoid caution regions 452 and 456. In some embodiments, caution regions 452 and 456 may be indicated on one or more maps of the environment before visual indications thereof are projected by projector 408 (e.g., before vehicle 400 moves along path 401).

As vehicle 400 moves through the environment, the pose of projector 408 may be adjusted to keep the projected visual indications of caution regions 452 and 456 fixed in relation to pallet rack 434 and pallet 422, respectively. That is, motion of projector 408 may operate to keep visual indications consistently projected onto caution regions 452 and 456, regardless of the position of vehicle 400 along path 401.

Figure 4G:
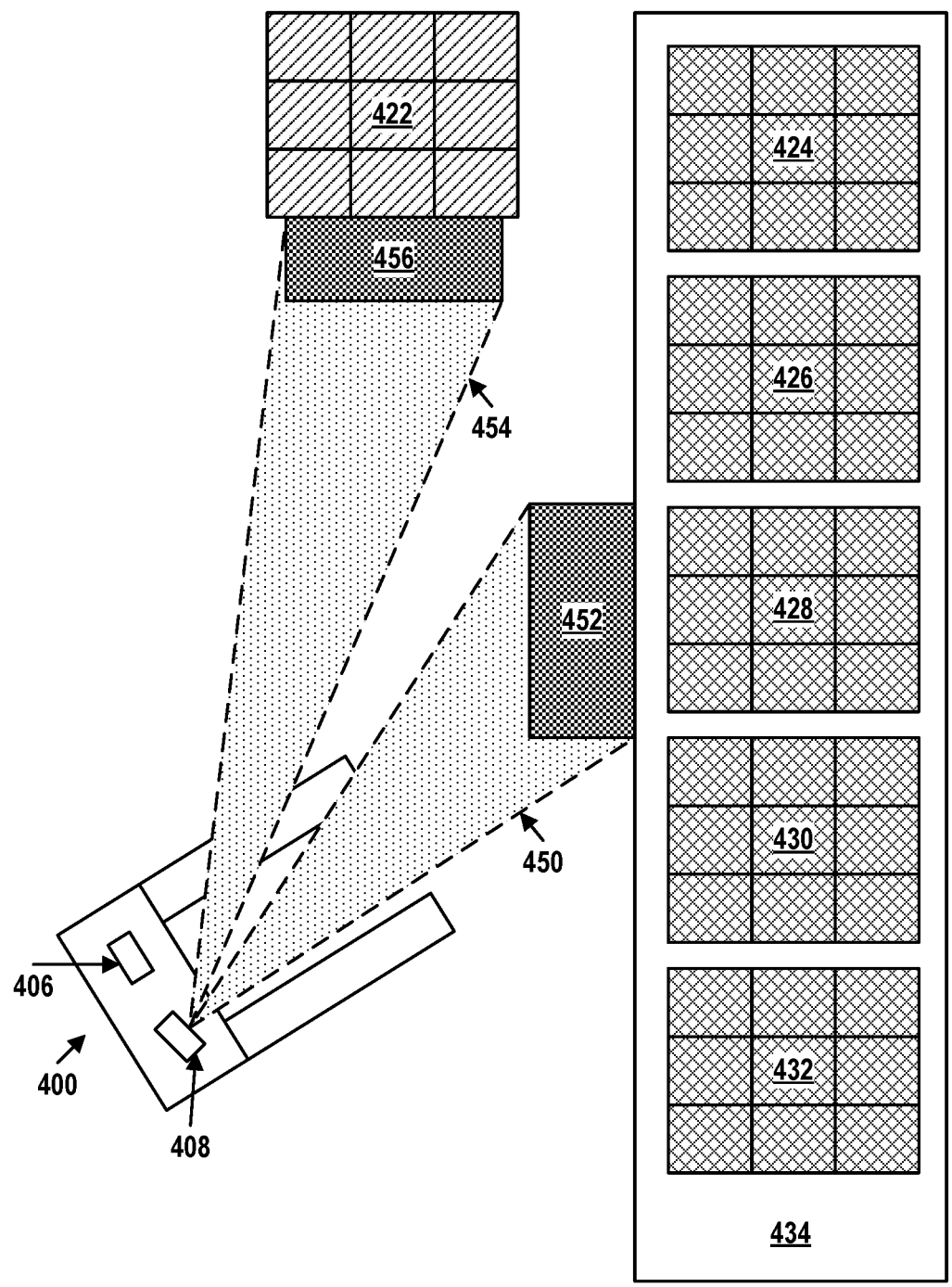
FIG. 4G illustrates indications of caution regions, in accordance with example embodiments.
Figure 4H:
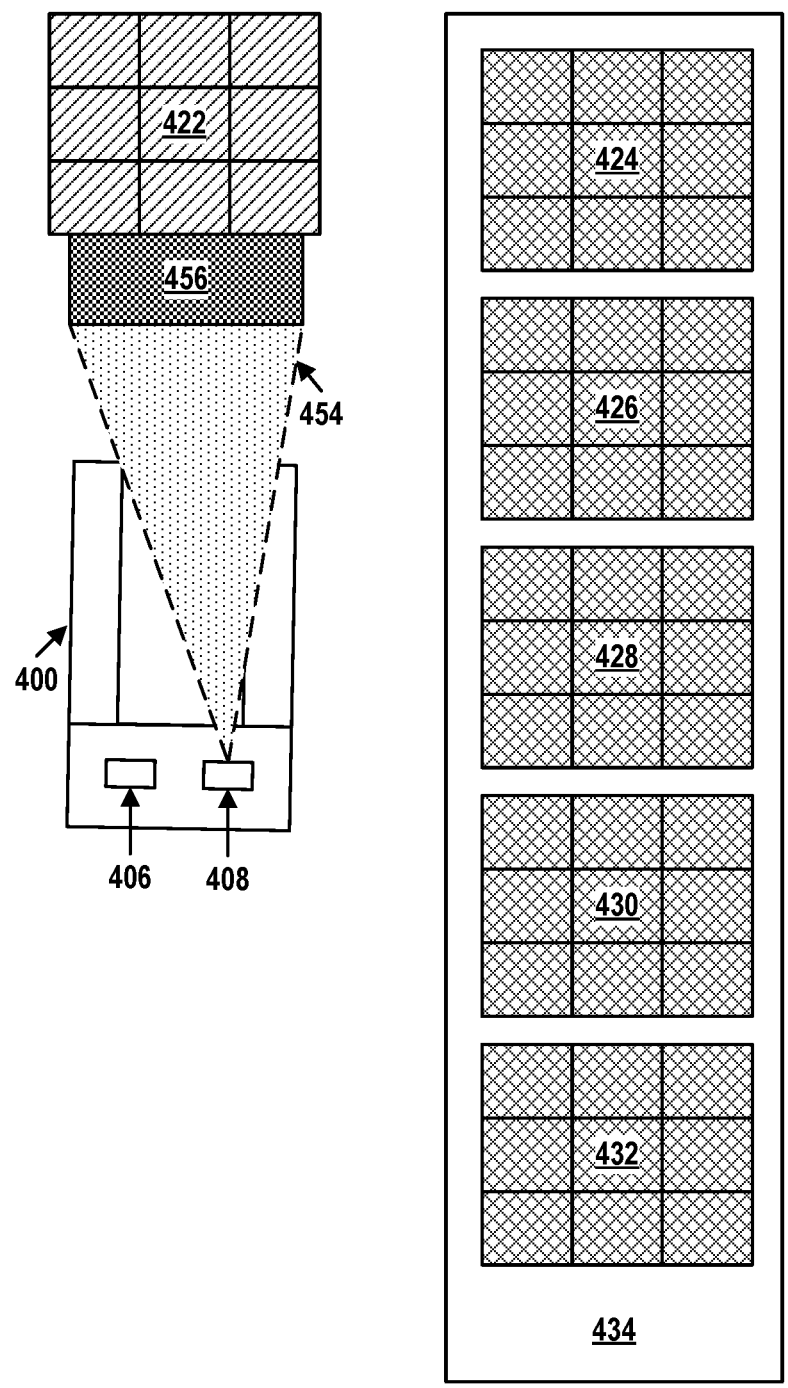
FIG. 4H illustrates indications of caution regions, in accordance with example embodiments.

FIG. 4G, for example, illustrates vehicle 400 after it has moved along path 401 to approximately position 414 (i.e., footprint 415). The pose of projector 408 has been adjusted by turning projector 408 in a counterclockwise direction relative to the pose, in a reference frame of vehicle 400, shown in FIG. 4F. The adjusted pose thus ensures that light beams 450 and 454 continue to be directed onto caution regions 452 and 456, respectively. Similarly, FIG. 4H illustrates vehicle 400 after it has moved along path 401 to approximately position 418 (i.e., footprint 419). The pose of projector 408 has been further adjusted by turning projector 408 in a clockwise direction relative to the pose, in the reference frame of vehicle 400, shown in FIG. 4G. The indication of caution region 452 is no longer projected since vehicle 400 has already entered and exited caution region 452 while passing position 416. However, the further adjusted pose ensures that light beam 454 continues to be directed onto caution region 456 which is yet to be occupied by vehicle 400.

In some implementations, however, an actual position of the visual indications projected onto caution regions 456 and/or 452 to vary from a planned or expected position of these visual indications. Thus, although the planned position of the visual indications may be fixed in relation to the environment, the actual position may vary from the planned position by, for example, several millimeters, centimeters, or meters, depending on the circumstances. In one example, such variation may be caused by projector 408 not being able to be reoriented with respect to vehicle 400 quickly enough to compensate for changes in position of vehicle 400 relative to the environment. In another example, image processing capabilities of projector 408 or of the control system (e.g., refresh rate) might cause a delay in updating the actual visual projection to match the planned or expected visual projections. In a further example, occlusions along the paths of light beams 454 or 450 might also cause differences in position and appearance between the actual and planned visual indications. Nevertheless, the control system may operate to minimize an error or difference between the planned position and planned appearance of the visual indications and the actual position and actual appearance thereof.

In some embodiments, the visual indications may be projected onto surfaces within the environment that are not perpendicular to projector 408. Contents of the visual indications may therefore become distorted due to the keystone effect. For example, text contained within the visual indications may appear smaller on surfaces close to projector 408 and larger on surfaces farther away from projector 408. The projections of the visual indication may be adjusted to correct for the keystone effect.

A keystone correction may be determined for each of the visual indications based on a relative position and a relative angle between projector 408, vehicle 400, and the surfaces within the environment onto which the visual indications are to be projected. The keystone correction for a particular projector pose and vehicle position may be determined before projector 408 and vehicle 400 are moved to the particular projector pose and vehicle position. Thus, caution regions 452 and 456 may be indicated without any apparent visual distortions resulting from repositioning of vehicle 400 and projector 408. Keeping the projected visual indications of caution regions 452 and 456 fixed in relation to pallet rack 434 and pallet 422 may therefore further involve modulating the projected light beams 450 and 454 according to the keystone correction to account for any distortion of the visual indications resulting from repositioning of vehicle 400 and projector 408 along path 401.

In some embodiments, sensor 406 may be a camera and may be used to capture images of caution regions 452 and 456. The control system may, based on the images, verify that the visual indications are being projected onto caution regions 452 and 456 as planned. If the visual indications are not being projected as planned, the control system may indicate a fault with projector 408 to an operator of vehicle 400. In some embodiments, the control system may also stop vehicle 400 until proper functionality of projector 408 is restored.

When the visual indication are being projected, the control system may, based on the images, determine additional keystone corrections to apply to the visual indications to remove therefrom any keystone distortion detected based on the images. Still further, the control system may determine, based on the images and/or other sensor data, whether any unexpected occupants are present or are predicted to be present in the caution regions while vehicle 400 in operating nearby. When unexpected occupants are present, the control system may stop the vehicle, change the appearance of the visual projections (e.g., flash alternating red and yellow warnings), and/or cause a speaker on the vehicle to emit a warning sound, among other possibilities. In some embodiments, the control system may determine an escape path for the unexpected occupants to follow to move out of or avoid the caution region. The escape path may be projected onto the environment to allow the occupants to move in synchrony with the vehicle to avoid the vehicle as well as the caution region.

Figure 5:
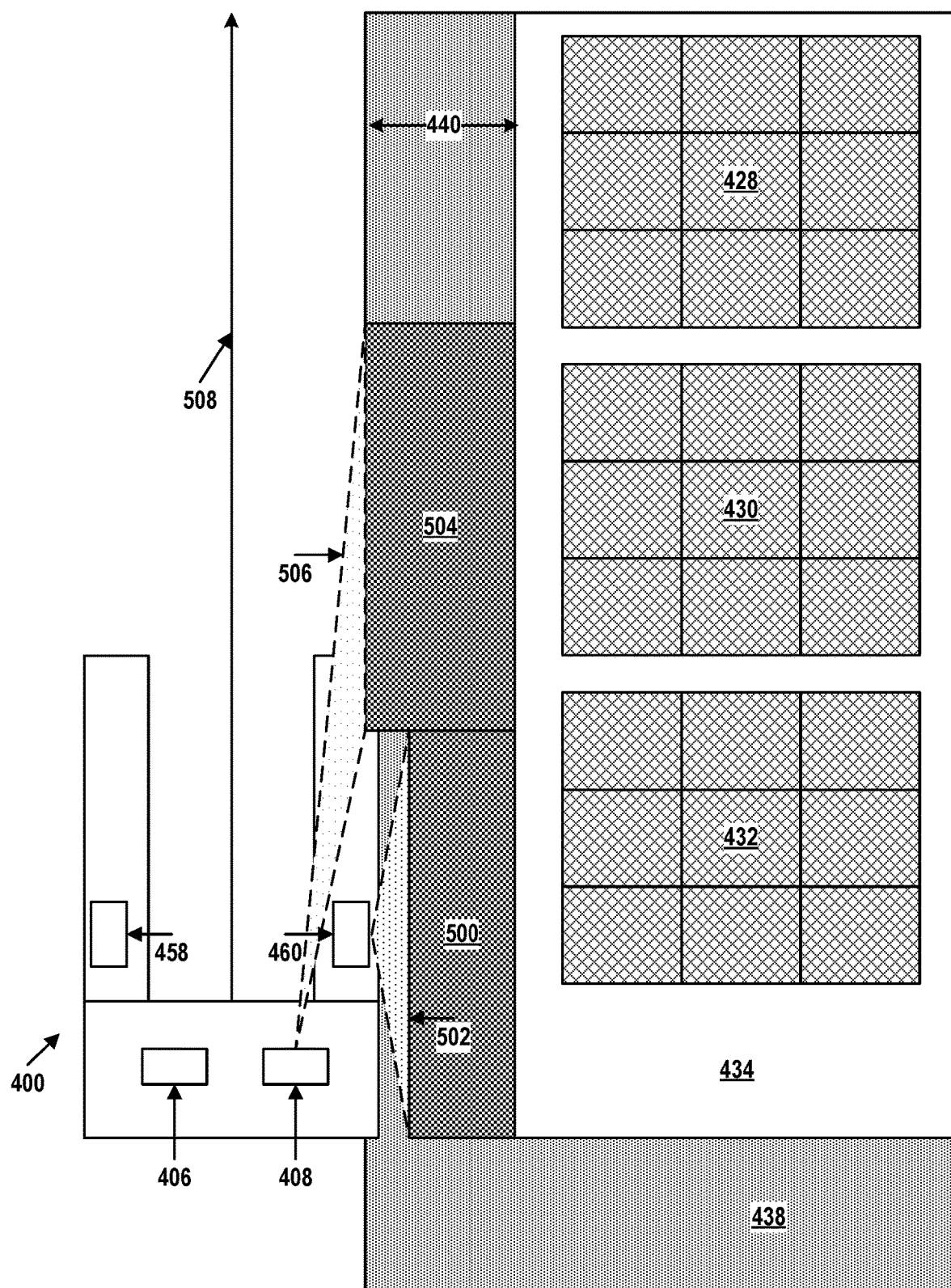
FIG. 5 illustrates indications of caution regions, in accordance with example embodiments.

In addition to projecting visual indications of caution regions before they are occupied by the vehicle (i.e., future caution regions), the control system may also determine and project visual indications of caution regions currently occupied by the vehicle (i.e., current caution regions). FIG. 5 illustrates vehicle 400 simultaneously projecting a first visual indication of future caution region 504 ahead of vehicle 400 and a second visual indication of current caution region 500 adjacent to vehicle 400, as indicated by light beams 506 and 502, respectively. Vehicle 400 may additionally include side projectors 458 and 460. As vehicle 400 moves along path 508, current and future footprints of vehicle 400 may overlap with threshold area 438 around pallet rack 434. Thus, to indicate to occupants of the environment that caution regions 500 and 504 are dangerous and should not be occupied, projectors 460 and 408 may project corresponding visual indications of these caution regions.

In some embodiments, projectors 458 and 460 may be fixedly connected to a chassis of vehicle 400, and may be used to project visual indications in a fixed direction relative to vehicle 400. That is, projectors 458 and 460 may be capable of projecting visual indications towards the left and right of vehicle 400, respectively. Accordingly, projectors 458 and 460 may be used to indicate current caution regions on the sides of vehicle 400, as well as to indicate the direction, relative to vehicle 400, of any future caution regions. For example, to indicate a caution region expected to arise on the left of vehicle 400 at a future time, projector 458 may illuminate an area near the left side of vehicle 400. The visual indication may include an arrow pointing towards the caution region, but might not be projected onto the caution region. Alternatively, projectors 458 and 460 may be movable with respect to vehicle 400 and may thus be used to indicate both current and future caution regions by projecting the visual indication onto these regions.

In either case, projectors 460 and 458 may be connected to a different portion of vehicle 400 than projector 408 and may therefore be able to project visual indications onto portions of the environment that might not be within a field-of-view range of projector 408. For example, by being connected under a body of vehicle 400, projector 460 can project a visual indication of caution region 500 very close to vehicle 400, while projector 408, positioned on top of the body of vehicle 400, might be unable to project that closely near vehicle 400. In some examples, rather than being connected to vehicle 400, projectors 408, 458, 460, or other additional projectors may be placed throughout the environment, and may thus project visual indications on behalf of one or more vehicles located in a vicinity of the projectors.

Notably, the visual projections herein described may be used as an alternative to physical indications such as painted lines, taped lines, traffic cones, or other physical delineations of potential caution regions around objects within the environment. In a warehouse, for example, safety standards may indicate that areas on the floor that could be occupied by a vehicle and located within, for example, 50 centimeters of a pallet rack are to be permanently painted, delineated, or otherwise marked as potential caution regions. Such marking of the floor of the warehouse may be expensive, may wear off with time and use, and is not dynamically adjustable based on planned operations of a vehicle. The visual projections, on the other hand, do not experience any wear and allow the caution regions to be dynamically marked without any physical changes to the warehouse. Additionally, the visual projections may be used to indicate caution regions around fixed objects (e.g., pallet rack 434, walls, etc.), as well as movable objects (e.g., pallet 422) and mobile objects (e.g., other vehicles). That is, the visual projections may be used to indicate caution regions around moveable and moving objects that would be too impractical to indicate using conventional methods.

V. SAFETY REGION DETECTION AND PROJECTION

Figure 6A:
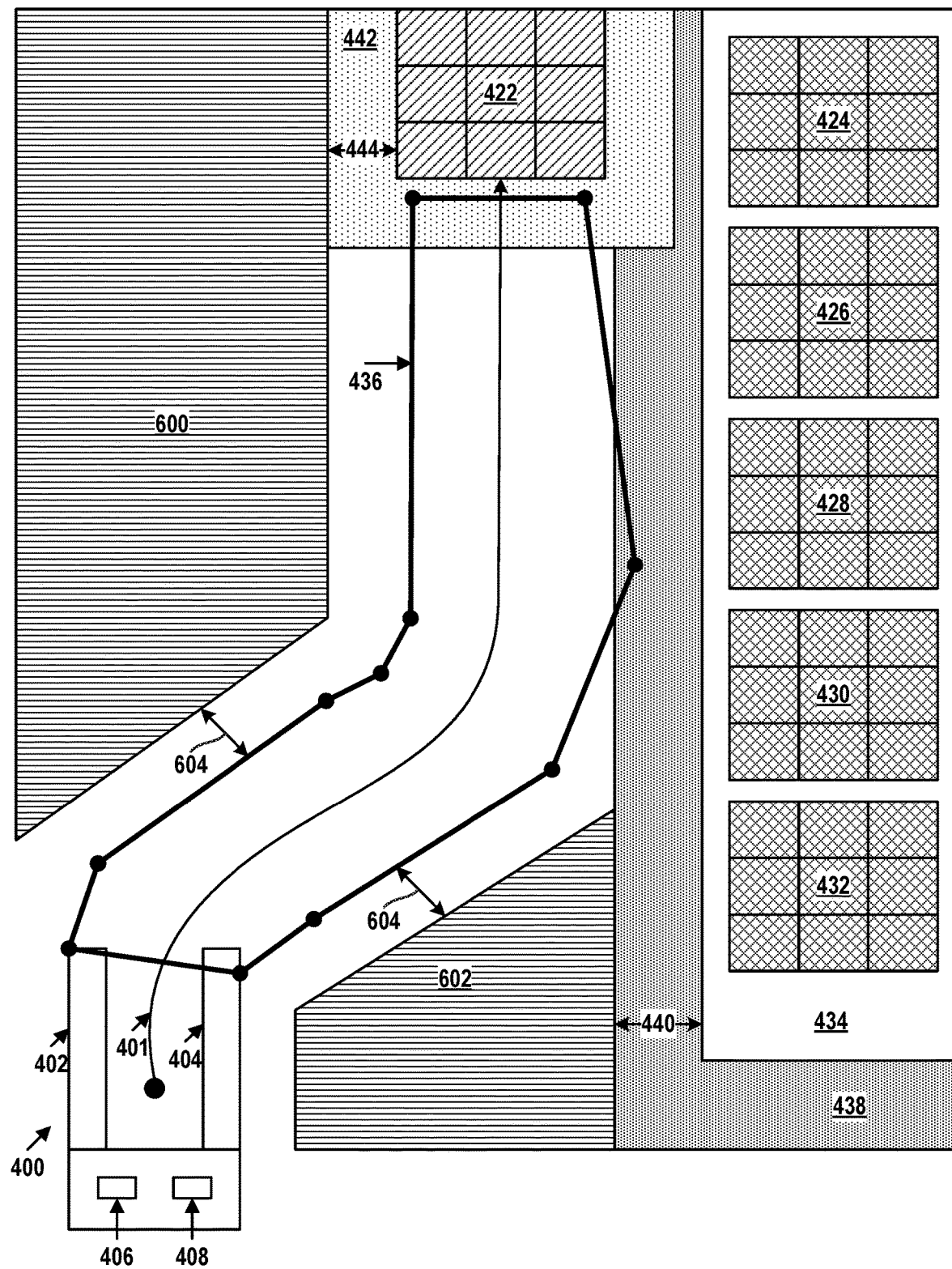
FIG. 6A illustrates indications of safety regions, in accordance with example embodiments.
Figure 6B:
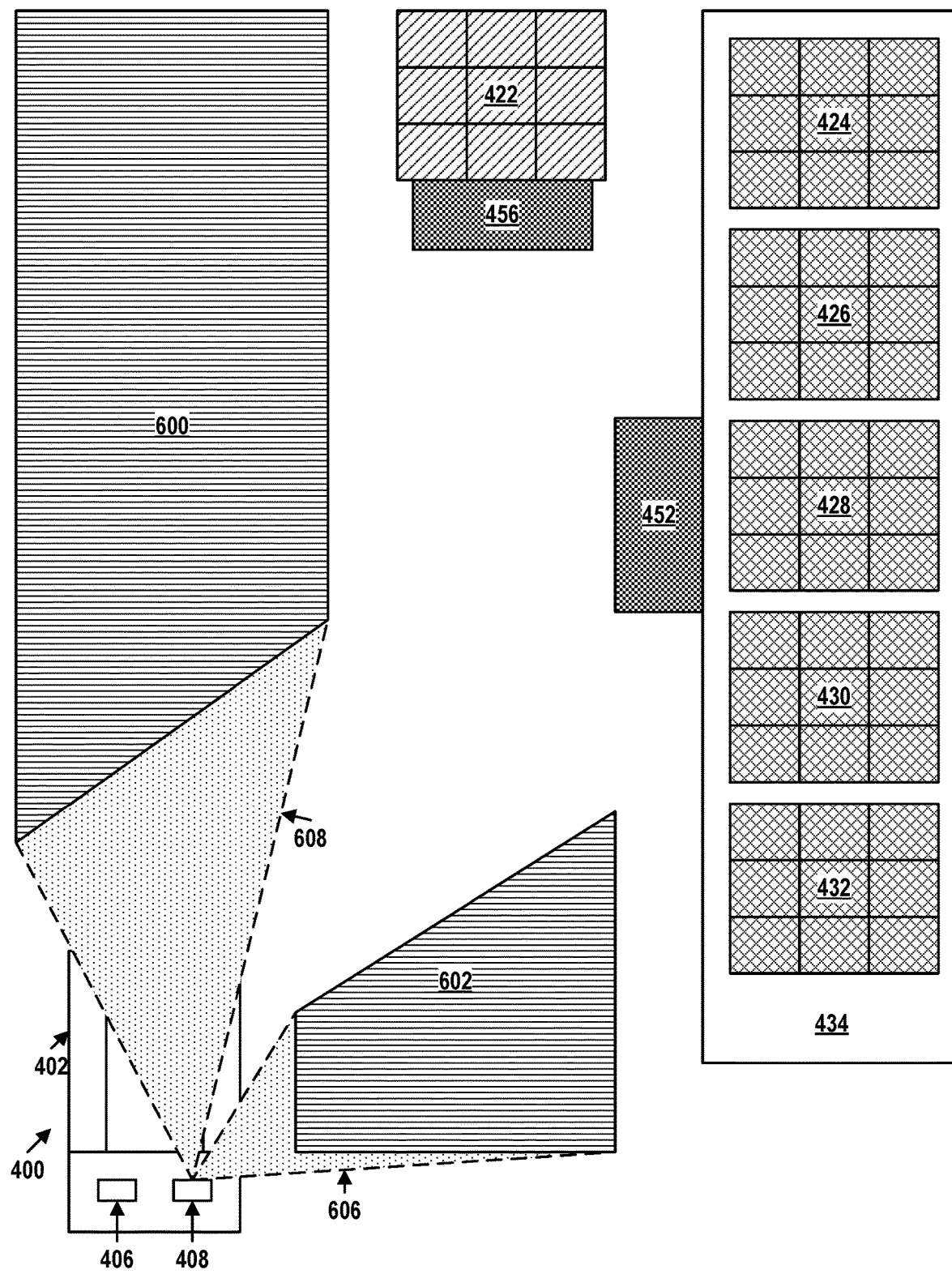
FIG. 6B illustrates indications of safety regions, in accordance with example embodiments.

FIGS. 6A and 6B illustrate safety regions 600 and 602 within the environment that are planned to be unoccupied by vehicle 400 within a predetermined future period of time. Safety regions 600 and 602 may be determined based on planned operating region 436. In one example, any area of the environment that is not within threshold distance 604 of planned operating region 436 may be a safety region. In another example, any area of the environment that is not within threshold distance 604 of planned operating region 436 and is also not within threshold areas 438 and 442 may be a safety region, as illustrated in FIG. 6A. Safety regions 600 and 602 may thus indicate to occupants of the environment where the occupants should positions themselves to avoid vehicle 400.

Light projector 408 may be caused to project additional indications of safety regions 602 and 600, as illustrated by light beams 606 and 608 in FIG. 6B. Visual indications of safety regions 602 and 600, as well as visual indications of caution regions 452 and 456, may be projected simultaneously by projector 408. To this end, in some embodiments, projector 408 may project a single beam wide enough to include all of regions 600, 602, 452, and 456. Alternatively, projector 408 may include multiple independently controllable sub-units that individually project indications onto each of regions 600, 602, 452, and 456.

In some embodiments, projector 408 may also be used to project onto the environment visual indications of planned operating region 436, path 401, positions 410-420, and footprints 413-421, among other information conveying intent or planned operations of vehicle 400. The visual indications of caution regions, safety regions, and planned operations may be visually distinct from one another, allowing occupants to easily distinguish the different areas and thus avoid occupying areas that are unsafe.

VI. EXAMPLE VISUAL INDICATIONS OF CAUTION REGIONS

Figure 7A:
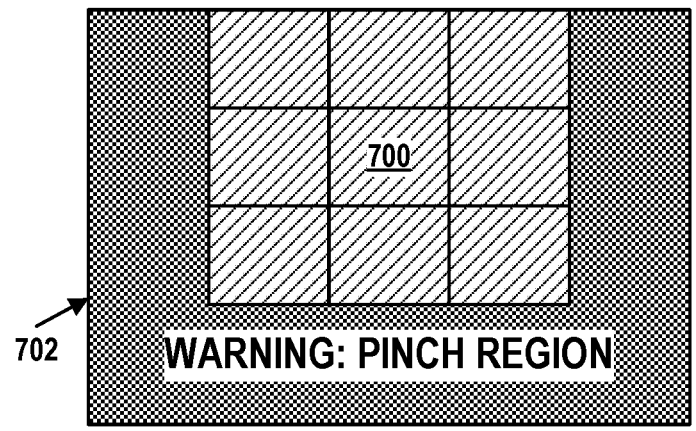
FIG. 7A illustrates content of indications of caution regions, in accordance with example embodiments.
Figure 7B:
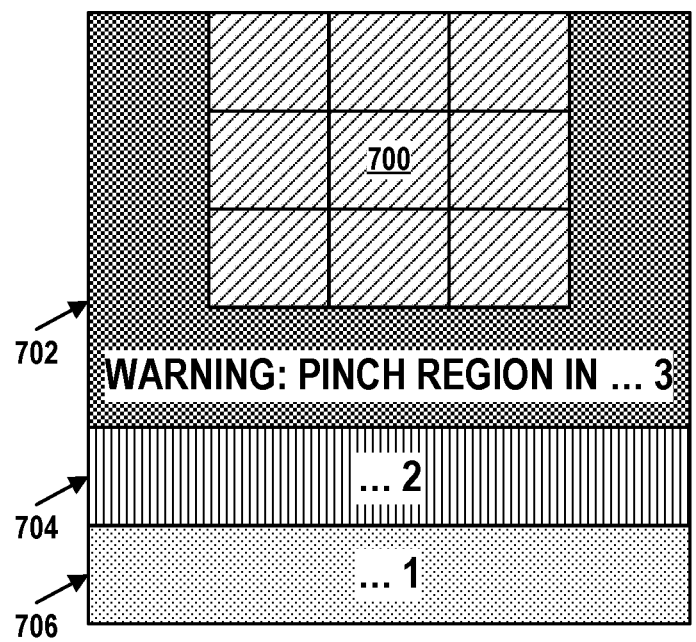
FIG. 7B illustrates content of indications of caution regions, in accordance with example embodiments.
Figure 7C:
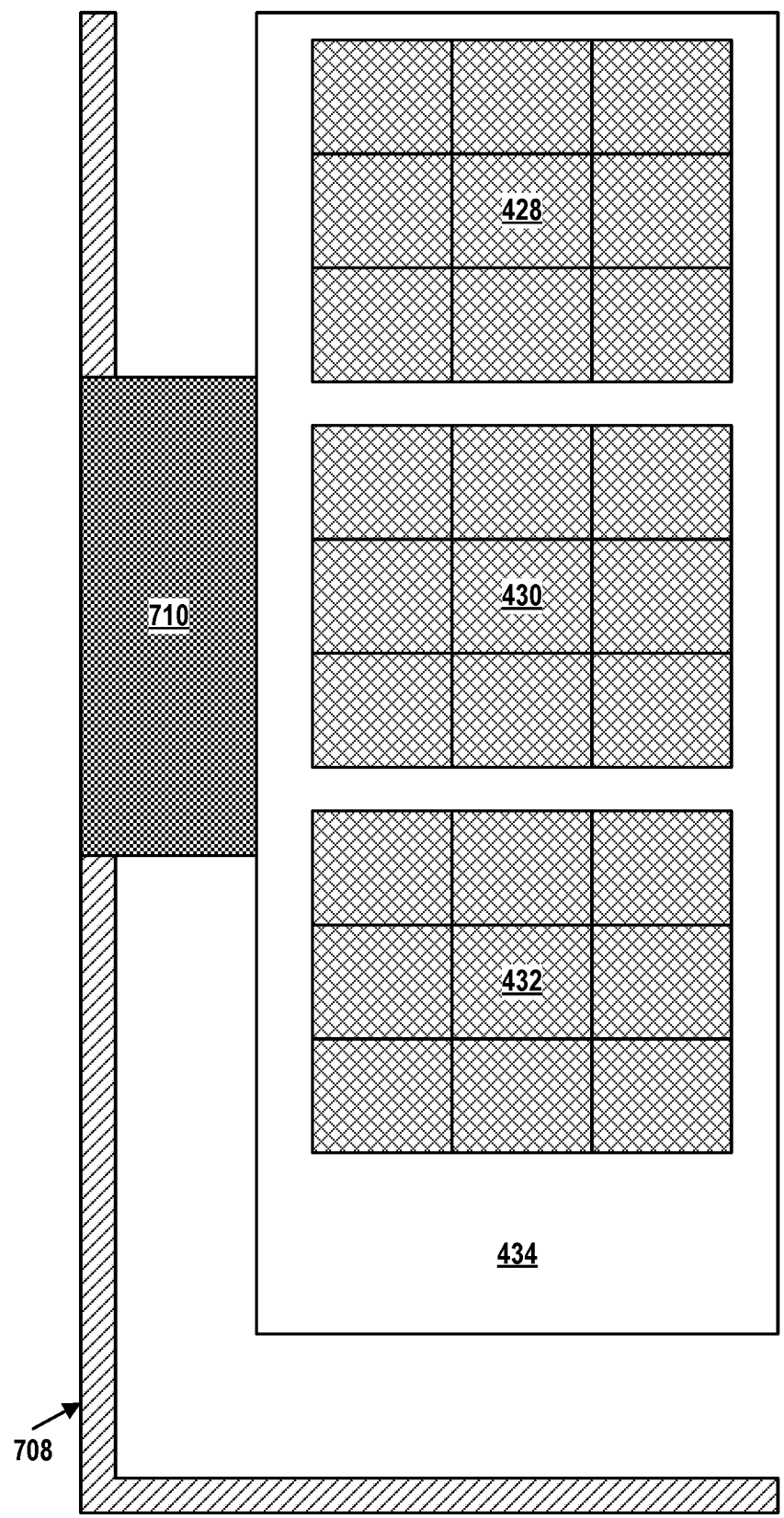
FIG. 7C illustrates content of indications of caution regions, in accordance with example embodiments.

FIGS. 7A, 7B, and 7C illustrate example structures and contents of visual indications of a caution region. A caution region may be predicted or expected to arise around pallet 700 when a vehicle comes or plans to come within a threshold distance of pallet 700 to, for example, pick up and move pallet 700. As FIG. 7A shows, visual indication 702 may therefore be projected onto a surface (e.g., ground surface) within the environment around pallet 700 to inform occupants of the caution region.

In some embodiments, visual indication 702 may be larger than the caution region around pallet 700. For example the caution region of pallet 700 may be similar to caution region 456 in front of pallet 422, as shown in FIGS. 4F-4H. However, visual indication 702 may be projected onto the area of the caution region as well as areas on the side of pallet 700, as shown in FIG. 7A. Visual indication 702 may be larger than the caution region to provide, out of an abundance of caution, a safety factor beyond the caution region. Visual indication 702 may also be larger than the caution region to account for the possibility that pallet 700 may be picked up and moved by the vehicle, and may thus be inadvertently pushed back or moved sideways during pick-up. In general, regardless of the motivation, the visual indications may be larger, equal in size to, or smaller than the caution region.

Regardless of size, visual indication 702 may include therein colors, patterns, images, or text that informs occupants of the caution region. The colors, patterns, images, or text may be defined by the safety standard, or may be custom-tailored to particular environments. For example, as shown in FIG. 7A, visual indication 702 may include text that reads "WARNING: PINCH REGION" to indicate to occupants that objects within the extent of space illuminated by visual indication 702 may get pinched between pallet 700 and the vehicle. In another example, the text may read "WARNING: LOW ESCAPE REGION" to indicate to occupants that occupants might not be able to easily leave the caution region once the vehicle moves into it. In a further example, the text may be more general, such as "CAUTION" or "KEEP OUT."

In some embodiments, additional visual indications 704 and 706 may be provided adjacent to visual indication 702, as shown in FIG. 7B. Visual indications 702, 704, and 706 may be visually distinct from one another, including different colors, patterns, images, or text. Such visual differences may be used to convey information about different levels of danger associated with occupying areas corresponding to or underlying each visual indication, or an amount of time remaining until the vehicle occupies the areas onto which the visual indications are projected. For example, visual indication 702 may include therein text that reads "WARNING: PINCH REGION IN . . . 3," visual indication 704 may include therein text that reads " . . . 2," and visual indication 706 may include therein text that reads " . . . 1." Thus, visual indications 702, 704, and 706 may inform occupants that the vehicle will occupy the area under indication 706 in one second, the area under indication 704 in two seconds, and the area under indication 702 in three seconds.

The text may be updated as the vehicle approaches the caution region. For example, indication 702 may be updated to read "WARNING: PINCH REGION IN . . . 2," indication 704 may be updated to read " . . . 1," and indication 706 might no longer be displayed as the vehicle enters the underlying area.

FIG. 7C show that, in addition to indicating caution regions, the visual projections may also indicate the threshold distances or threshold areas around objects which may give rise to potential caution regions. That is, in addition to visual indication 710 of a caution region, the projector may also project visual indication 708 delineating an extent of the threshold area around pallet rack 434 which gives rise to the caution region. Visual indication 708 may therefore provide information ordinarily provided by lines taped or painted on the floor of a warehouse.

FIG. 7D illustrates a 3D view of vehicle 400 projecting visual indication 702 around pallet 700 using light projector 408. Visual indication 702 is projected onto the floor of the environment and surrounds pallet 700. In some embodiments, visual indication 702 may additionally or alternatively be projected onto payload 712 loaded onto pallet 700 to provide a yet further indication of the caution region.

In some embodiments, the visual indication may take the form of a holographic 3D indication of the caution regions. Such an indication may be an actual-scale hologram, projected so as to "fill" the airspace at least where the vehicle will occupy the caution region in the future. Additionally or alternatively, the indication may be projected as a smaller-scale hologram. The 3D hologram may also depict the planned operating region as well as the safety regions. The 3D hologram may be projected or otherwise displayed as an open quadric surface, a closed quadric surface, convex hull, isosurface, or other complex or non-complex surface/volume.

In some embodiments, vehicle 400 may be configured to use a warning field and/or a protective field to facilitate safe navigation through the environment. The warning field may be a first virtual (i.e., defined in software) region defined around a portion of vehicle 400. For example, the warning field may be a region extending 1 meter in front of vehicle 400. Vehicle 400 may be configured to use a sensor to detect objects within the environment. When an object is detected within the warning field, vehicle 400 may be caused to travel under a threshold speed (i.e., the maximum speed of vehicle 400 may be limited). This may allow vehicle 400 to slow down in anticipation of a potential collision with the object, thus making operation of vehicle 400 safer.

The protective field may be a subset of the warning field. For example, the protective field may be a region extending half a meter in front of vehicle 400. When an object is detected within the protective field, vehicle 400 may be caused to come to a stop to avoid a potential collision with the object. In some examples, the size and positioning of the warning and/or protective fields with respect to vehicle 400 may vary, for example, based on speed or a task performed by vehicle 400.

In addition to projecting visual indications of caution regions, projector 408 may also be used to project a visual indication of the warning fields and/or the protective fields of vehicle 400. This may allow human occupants of the environment to see and understand why vehicle 400 is behaving in a particular way, as well as better predict the future behavior of vehicle 400. In some instances, however, the protective and/or warning fields may be disabled. For example, when vehicle 400 moves pallets in deep aisles or loads pallets onto pallet racks (e.g., onto the low level of a pallet rack), the warning and protective fields may be disabled so as to allow vehicle 400 to come within a distance of the pallet racks needed to transport, load, or unload pallets, but that would otherwise cause vehicle 400 to slow down or stop. In such cases, the projected visual indications of the disabled warning and/or protective fields may be used to warn occupants of the environment of the fact that the warning and/or protective fields are disabled, and vehicle 400 thus might not stop for nearby obstacles. When the warning and/or protective fields are disabled, the visual indications thereof may be visually different from the visual indications projected when the warning and/or protective fields are enabled in order to prompt occupants of the environment to be more cautious when the vehicle's warning and/or protective fields are disabled. Additionally, vehicle 400 may provide audible signals to indicate that the warning and/or protective fields are disabled.

VII. ADDITIONAL EXAMPLE OPERATIONS

Figure 8:
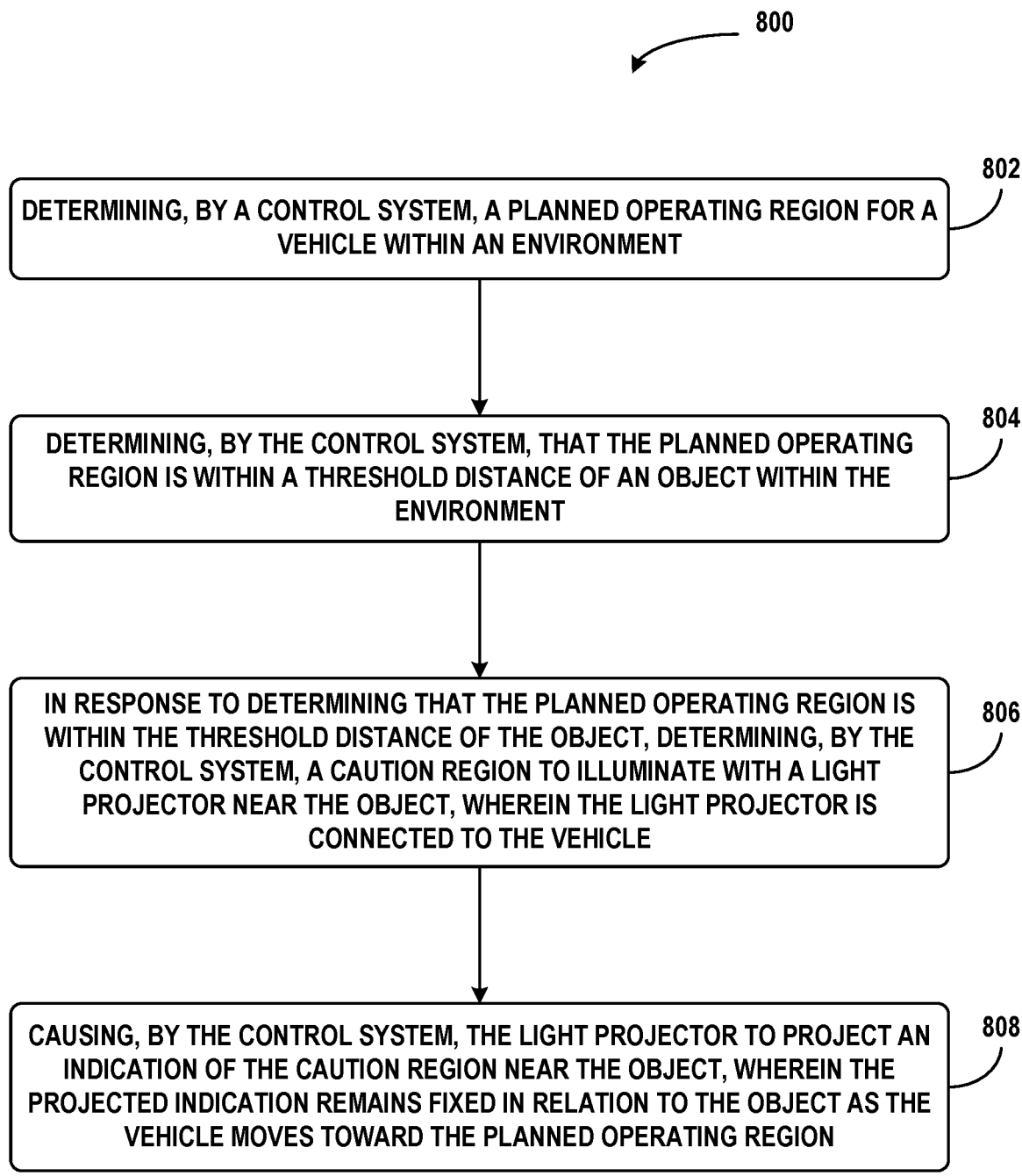
FIG. 8 illustrates a flow chart, in accordance with example embodiments.

FIG. 8 illustrates flowchart 800 of example operations related to detection of caution regions and projecting of visual indications of the detected caution regions by a robotic system (e.g., robotic system 100, robotic device 220, AGV 340, or fork truck 360). These operations may be executed by control system 118 of robotic system 100, onboard software 230 of robotic device 220, or planning system 210, for example.

Block 802 may involve determining, by a control system, a planned operating region for a vehicle within an environment.

Block 804 may involve determining, by the control system, that the planned operating region is within a threshold distance of an object within the environment.

Block 806 may involve in response to determining that the planned operating region is within the threshold distance of the object, determining, by the control system, a caution region to illuminate with a light projector near the object, wherein the light projector is connected to the vehicle.

Block 808 may involve causing, by the control system, the light projector to project an indication of the caution region near the object, wherein the projected indication remains fixed in relation to the object as the vehicle moves toward the planned operating region.

Keeping the projected indication fixed in relation to the object may involve the control system adjusting a position and orientation of the light projector to reduce or minimize a difference between a planned position of the visual indications within the environment and an actual position thereof. In some circumstances the actual position of the projected visual indications may vary from the planned position of the visual indications due to, for example, delay in physically reorienting the projector, limitations in capabilities of the projector, and/or occlusions along the path of projected light, among other causes.

In some embodiments, the caution region may include a buffer area near at least part of a perimeter of the object.

In some embodiments, determining the caution region may involve determining an intersection between the planned operating region and a first area, where the first area (i) surrounds the perimeter of the object and (ii) is within the threshold distance of the perimeter of the object. Determining the caution region may also involve determining a second area between the intersection and the perimeter of the object and combining the intersection and the second area to form the caution region.

In some embodiments, causing the light projector to project the indication of the caution region near the object may involve projecting the indication of the buffer area onto a ground surface of the environment near the object.

In some embodiments, the light projector may be repositionable with respect to the vehicle in two or more degrees of freedom. The vehicle may be caused to move towards the planned operating region and, while the vehicle moves towards the planned operating region, the light projector may be repositioned with respect to the vehicle to project the caution region in a fixed position in relation to the object.

In some embodiments, a keystone correction to apply to the indication of the caution region may be determined based on (i) a positioning of the light projector with respect to the vehicle and (ii) a positioning of the vehicle with respect to the caution region. The light projector may be caused to project the indication of the caution region modified according to the determined keystone correction.

In some embodiments, the light projector may be caused to project the indication of the caution region near the object before the planned operating region is occupied by the vehicle.

In some embodiments, the light projector may be caused to project the indication of the caution region near the object while the planned operating region is occupied by the vehicle.

In some embodiments, the planned operating region includes an area to be occupied by the vehicle while picking up the object, and the caution region includes an area between the planned operating region and the object.

In some embodiments, the threshold distance may be a first threshold distance. Based on the planned operating region, a safety region may be determined within the environment that is planned to be unoccupied by the vehicle, where the planned operating region is beyond a second threshold distance of the safety region. The light projector may be caused to project another indication of the safety region.

In some embodiments, based on a position of the planned operating region and a position of the object within the environment, a distance between the planned operating region and the object may be determined. Based on the distance between the planned operating region and the object, a size of the caution region may be determined. The light projector may be caused to project an indication of the caution region having the determined size.

In some embodiments, a size of the caution region may be determined based on a speed planned for the vehicle within the planned operating region. The light projector may be caused to project the indication of the caution region having the determined size.

In some embodiments, the light projector may include at least a first light source 124 connected to a first side of the vehicle and at least a second light source 126 connected to a second side of the vehicle. An orientation of the vehicle with respect to the caution region may be determined. Based on the determined orientation, at least one of the first light source or the second light source may be selected to illuminate the caution region. The selected light source may be caused to project the indication of the caution region.

In some embodiments, the first light source may be connected underneath a body of the vehicle on the first side of the body. The second light source may be connected underneath the body of the vehicle on the second side of the body.

In some embodiments, the caution region may include an area within the threshold distance of the object.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
    a vehicle;
    a light projector connected to the vehicle; and
    a control system comprising at least one processor and data storage having stored therein computer-readable program instructions, wherein the control system is configured to:
        determine a planned operating region for the vehicle within an environment;
        determine that the planned operating region is within a threshold distance of an object within the environment;
        in response to determining that the planned operating region is within the threshold distance of the object, determine a caution region to illuminate with the light projector near the object;
        determine a size of the caution region based on a speed planned for the vehicle within the planned operating region; and
        cause the light projector to project an indication of the caution region near the object, wherein the caution region has the determined size, and wherein the projected indication remains fixed in relation to the object as the vehicle moves toward the planned operating region.

2. The system of claim 1, wherein the caution region comprises a buffer area near at least part of a perimeter of the object.

3. The system of claim 2, wherein the control system is configured to determine the caution region by:
    determining an intersection between the planned operating region and a first area, wherein the first area (i) surrounds the perimeter of the object and (ii) is within the threshold distance of the perimeter of the object;
    determining a second area between the intersection and the perimeter of the object; and
    combining the intersection and the second area to form the caution region.

4. The system of claim 2, wherein the control system is configured to cause the light projector to project the indication of the caution region near the object by:
    projecting the indication of the buffer area onto a ground surface of the environment near the object.

5. The system of claim 1, wherein the light projector is repositionable with respect to the vehicle in two or more degrees of freedom, and wherein the control system is further configured to:
    cause the vehicle to move towards the planned operating region; and while the vehicle moves towards the planned operating region, reposition the light projector with respect to the vehicle to project the caution region in a fixed position in relation to the object.

6. The system of claim 5, wherein the control system is further configured to:
based on (i) a positioning of the light projector with respect to the vehicle and (ii) a positioning of the vehicle with respect to the caution region, determine a keystone correction to apply to the indication of the caution region; and
cause the light projector to project the indication of the caution region modified according to the determined keystone correction.

7. The system of claim 1, wherein the control system is configured to cause the light projector to project the indication of the caution region near the object before the planned operating region is occupied by the vehicle.

8. The system of claim 1, wherein the control system is configured to cause the light projector to project the indication of the caution region near the object while the planned operating region is occupied by the vehicle.

9. The system of claim 1, wherein the planned operating region comprises an area to be occupied by the vehicle while picking up the object, and wherein the caution region comprises an area between the planned operating region and the object.

10. The system of claim 1, wherein the threshold distance is a first threshold distance, and wherein the control system is further configured to:
determine, based on the planned operating region, a safety region within the environment planned to be unoccupied by the vehicle, wherein the planned operating region is beyond a second threshold distance of the safety region; and
cause the light projector to project another indication of the safety region.

11. The system of claim 1, wherein the light projector comprises at least a first light source connected to a first side of the vehicle and at least a second light source connected to a second side of the vehicle, and wherein the control system is further configured to:
determine an orientation of the vehicle with respect to the caution region;
based on the determined orientation, select at least one of the first light source or the second light source with which to illuminate the caution region; and
cause the at least one selected light source to project the indication of the caution region.

12. The system of claim 11, wherein the first light source is connected underneath a body of the vehicle on the first side of the body, and wherein the second light source is connected underneath the body of the vehicle on the second side of the body.

13. A method comprising:
determining, by a control system, a planned operating region for a vehicle within an environment;
determining, by the control system, that the planned operating region is within a threshold distance of an object within the environment;
in response to determining that the planned operating region is within the threshold distance of the object,
determining, by the control system, a caution region to illuminate with a light projector near the object, wherein the light projector is connected to the vehicle, wherein the caution region comprises a buffer area near at least part of a perimeter of the object, and wherein determining the caution region comprises:
determining an intersection between the planned operating region and a first area, wherein the first area (i) surrounds the perimeter of the object and (ii) is within the threshold distance of the perimeter of the object;
determining a second area between the intersection and the perimeter of the object; and
combining the intersection and the second area to form the caution region; and
causing, by the control system, the light projector to project an indication of the caution region near the object, wherein the projected indication remains fixed in relation to the object as the vehicle moves toward the planned operating region.

14. The method of claim 13, wherein causing the light projector to project the indication of the caution region near the object comprises:
projecting the indication of the buffer area onto a ground surface of the environment near the object.

15. The method of claim 13, wherein the light projector is repositionable with respect to the vehicle in two or more degrees of freedom, and wherein the method further comprises:
causing the vehicle to move towards the planned operating region; and
while the vehicle moves towards the planned operating region, repositioning the light projector with respect to the vehicle to project the caution region in a fixed position in relation to the object.

16. A non-transitory computer readable storage medium having stored thereon instruction that, when executed by a computing device, cause the computing device to perform operation comprising:
determining a planned operating region for a vehicle within an environment;
determining that the planned operating region is within a threshold distance of an object within the environment;
in response to determining that the planned operating region is within the threshold distance of the object, determining a caution region to illuminate with a light projector near the object, wherein the light projector is connected to the vehicle;
determining, based on a position of the planned operating region and a position of the object within the environment, a distance between the planned operating region and the object;
determining, based on the distance between the planned operating region and the object, a size of the caution region; and
providing instructions to cause the light projector to project an indication of the caution region near the object, wherein the caution region has the determined size, and wherein the projected indication remains fixed in relation to the object as the vehicle moves toward the planned operating region.

* * * * *